United States Patent
Bott et al.

(10) Patent No.: US 11,361,087 B2
(45) Date of Patent: Jun. 14, 2022

(54) SECURITY DATA PROCESSING DEVICE

(71) Applicant: Secure Thingz Limited, Cambridge (GB)

(72) Inventors: Andrew Bott, Cambridge (GB); Timothy Hoole, Foxton (GB)

(73) Assignee: SECURE THINGZ LIMITED, Cambridge (GB)

(*) Notice: Subject to any disclaimer, the term of this patent is extended or adjusted under 35 U.S.C. 154(b) by 181 days.

(21) Appl. No.: 16/784,373

(22) Filed: Feb. 7, 2020

(65) Prior Publication Data
US 2020/0272745 A1    Aug. 27, 2020

(51) Int. Cl.
*G06F 21/60* (2013.01)
*H04L 9/08* (2006.01)
*H04L 9/32* (2006.01)

(52) U.S. Cl.
CPC ........... *G06F 21/602* (2013.01); *H04L 9/088* (2013.01); *H04L 9/3247* (2013.01)

(58) Field of Classification Search
CPC ........ G06F 21/602; G06F 21/57; G06F 21/72; G06F 21/44; G06F 21/54; G06F 21/62; G06F 21/71; H04L 9/088; H04L 9/3247; H04L 9/0897; H04L 9/3234; H04L 2209/127; H04L 9/08; H04W 4/70;
(Continued)

(56) References Cited

U.S. PATENT DOCUMENTS 8,489,841 B1    7/2013 Strecke et al.
10,333,716 B2 *  6/2019 Blinn ................... H04L 9/3236
(Continued)

FOREIGN PATENT DOCUMENTS

WO           200161437 A3     8/2001
WO       WO 2015/174903 A1 *  11/2015  .............. H04W 4/00

OTHER PUBLICATIONS

Search Report for Application No. GB1902470.2 dated Aug. 7, 2019.
(Continued)

*Primary Examiner* — Christopher A Revak
(74) *Attorney, Agent, or Firm* — Hamilton, Brook, Smith & Reynolds, P.C.

(57) ABSTRACT

A security data processing device comprising a processor and memory, the processor configured to: receive a script comprising at least one instruction set for provisioning a type of programmable device, the instruction set(s) defining one or more cryptographic operations, each of the cryptographic operations referring to a parameter; store the script in memory; verify a signature associated with the script using an authorization key retrieved from memory; receive a programming request from a programming module of a programming machine in communication with said processor, said programming request requesting the programming of a programmable device and identifying an instruction set of the instruction set(s) in said script; for each cryptographic operation in the identified instruction set, determine a value for the parameter and perform the cryptographic operation using the value; and in response to performing each cryptographic operation, output programming information to the programming module for programming the programmable device.

20 Claims, 9 Drawing Sheets

(58) Field of Classification Search
CPC ......... H04W 4/02; H04W 12/35; H04W 4/50; H04W 12/00
See application file for complete search history.

(56) References Cited

U.S. PATENT DOCUMENTS

| | | |
|---|---|---|
| 10,771,448 B2 * | 9/2020 | Kocher .................. G06F 21/71 |
| 2006/0059574 A1 | 3/2006 | Fayad et al. |
| 2008/0307499 A1 | 12/2008 | Hill |
| 2009/0217054 A1 * | 8/2009 | Haider ................. H04L 9/3247 713/189 |
| 2014/0044265 A1 | 2/2014 | Kocher et al. |
| 2018/0041341 A1 * | 2/2018 | Gulati .................. G06F 21/575 |
| 2021/0232681 A1 * | 7/2021 | Tsirkin .................... G06F 21/53 |

OTHER PUBLICATIONS

Search Report for Application No. GB1908939.0 dated Jan. 8, 2020.

* cited by examiner

SECURITY DATA PROCESSING DEVICE

RELATED APPLICATION(S)

This application claims priority under 35 U.S.C. § 119 or 365 to United Kingdom, Application No. 1902470.2, filed Feb. 22, 2019 and claims priority under 35 U.S.C. § 119 or 365 to United Kingdom, Application No. 1908939.0, filed Jun. 21, 2019. The entire teachings of the above applications are incorporated herein by reference.

BACKGROUND

A Hardware Security Module (HSM) is often used to deploy software code and cryptographic keys onto a programmable device securely (for use in a consumer device).

A Hardware Security Module is a device that can create and hold private keys and secret keys securely so that they may not be extracted. The HSM also provides the ability to perform some selected cryptographic operations with the keys.

Generally speaking HSMs are used to hold and use private keys and respond to a simple request to deliver, for example, a single key.

SUMMARY

A manufacturing party in the form of an Original Equipment Manufacturer (OEM) creates consumer products eventually to be sold to their end customer, which contain programmable devices (e.g. a secure element, microprocessor, microcontroller etc.). An OEM wants to provision the programmable devices with OEM-specific information, X.509 Certificates, and security keys and other credentials. This allows the OEM to make consumer products that can be uniquely and securely authenticated across the Internet, allowing the OEM to fully trust the data supplied by the programmable devices.

Each programmable device must be provisioned so that it can be securely differentiated from every other programmable device: this is done for instance by using state of the art cryptographic techniques such as asymmetric cryptography with a unique private key per programmable device and an associated X.509 certificate. HSMs in factories used to provision programmable devices must retain the integrity of the final product over multiple product runs.

There are multiple different types of programmable devices, all requiring slightly different storage arrangements, built-in cryptographic accelerators, and selections of keys and certificates, and other security information. New types of programmable devices are being added to the catalogues of programmable device manufacturers regularly (e.g. weekly).

The inventors have recognized that as new programmable devices become available the HSM software (which controls the operation of the HSM) needs to be updated each time to accommodate the new programmable devices. However, an HSM currently requires a software image update to deal with each new type of programmable device, but the HSM, being in constant use in the factory, cannot easily be upgraded when desired. The process of updating an HSM in situ is difficult and there is high risk the changes might stop other product lines from continuing to be provisioned correctly.

Embodiments of the present disclosure address a number of technical problems including:

(i) how to add the ability to provision future, but yet unknown, programmable devices without having to coordinate and manage the upgrade of many HSMs across many different factories.

Embodiments of the present disclosure advantageously avoid costly interruptions to the manufacturing line that would otherwise be incurred when upgrading an HSM for the provisioning of new programmable devices. Embodiments of the present disclosure advantageously further avoid costly interruptions to the manufacturing line that due to retesting of old devices in the manufacturing line following the HSM update. Furthermore, embodiments of the present disclosure advantageously avoid the cost of replacing any old devices that fail the retest.

(ii) how to ensure the OEM can trust the factory, generally an unsecure environment, to do the necessary cryptographic functions securely, in particular keeping secret keys secret, and ensuring that the right keys are used in the right places and nowhere else.

Embodiments of the present disclosure advantageously protects the OEM's secrets and device credentials so that the factory may perform cryptographic operations without having access to the OEM's keys, and moreover the factory cannot re-use the secrets/credentials for other products, hence the OEM does not need to trust the factory to keep its secrets. This provides protection against cloning (whereby the same certificate is loaded into more than one programmable device). Cloned devices can be adverse to the OEM for numerous reasons. For example, cloned devices may demand support from the OEM thus requiring the OEM to incur computational resource repairing, updating and/or servicing cloned devices and incurring network bandwidth providing this support to the cloned devices.

(iii) how to ensure that the instructions to the factory cannot be tampered with, for instance in transit or while in storage, so that the consumer product retains its integrity.

Embodiments of the present disclosure advantageously maintains the integrity of information used in the provisioning of programmable devices by using cryptographic integrity signatures to ensure that the information is not modified in transit or while residing on the HSM in the factory.

According to one aspect of the present disclosure there is provided a security data processing device comprising a processor and a memory coupled to the processor, the processor configured to: receive a script comprising at least one instruction set for provisioning a type of programmable device, each of the at least one instruction set defining one or more cryptographic operations to be performed by the security data processing device, each of the one or more cryptographic operations referring to a parameter; store the script in the memory; retrieve a first authorization key from said memory and verify a signature associated with the script using the first authorization key, wherein the script is signed by a producer of the script; receive a programming request from a programming module of a programming machine in communication with said processor, said programming request requesting the programming of a programmable device and identifying an instruction set of the least one instruction set in said script; for each of the one or more cryptographic operations in the identified instruction set, determine a value for the parameter referred to in the cryptographic operation and perform the cryptographic operation using the value; and in response to performing each of the one or more cryptographic operation, output programming information to the programming module for programming the programmable device.

For one or more of the cryptographic operations in the identified instruction set, the processor may be configured to determine the value for the parameter defined in the cryptographic operation by extracting said value from the programming request.

For one or more of the cryptographic operations in the identified instruction set, the processor may be configured to determine the value for the parameter defined in the cryptographic operation by reading said value from the script.

The processor may be configured to receive the script and metadata in a configuration file and for one or more of the cryptographic operations in the identified instruction set, the processor is further configured to determine the value for the parameter defined in the cryptographic operation by querying said metadata.

The metadata may be signed and the processor is configured to verify a signature of the metadata using the first authorization key or a second authorization key.

The metadata may be signed by the producer of the script.

The signature may be further associated with the metadata.

The script may comprise a unique identifier and the metadata includes a reference to the unique identifier of the script.

The metadata may define the value for the parameter.

The metadata may define that the value is to be generated by the security data processing device, and the processor may be further configured to determine the value for the parameter by generating said value.

The metadata may define that the value is to be accessed from a data file, and the processor may be configured to: access the data file comprising at least a value for said parameter; retrieve a third authorization key from said memory and verify a signature associated with the data file using the third authorization key, wherein the data file is signed by a manufacturing party; wherein the processor is further configured to determine the value for the parameter based on querying the data file.

The processor may be configured to receive the data file and store the data file in the memory.

The metadata may comprise a unique identifier and the data file may include a reference to the unique identifier of the metadata.

The value for said parameter may be encrypted and the processor is configured to decrypt the value with a wrapping key stored in said memory.

The metadata is encrypted and the processor may be configured to decrypt the script with a cryptographic key stored in said memory.

The programming module may perform programming of the programmable device in accordance with a programmer script, the programmer script comprising a unique identifier, and the script comprises a reference to the unique identifier of the programmer script.

The script may be encrypted and the processor may be configured to decrypt the script with a cryptographic key stored in said memory. The script and the metadata may be encrypted with a single or separate (respective) keys. All or a portion of the script may be encrypted. Similarly, all or a portion of the metadata may be encrypted.

The security data processing device may comprise a hardware security module.

The processor may be configured to: receive a record comprising: a product identifier; a sequence element; and encrypted information, wherein the sequence element is associated with the product identifier; query the memory using said product identifier to determine a value for a sequence element parameter that is stored in the memory in association with the product identifier, wherein the sequence element and the value for the sequence element parameter are elements of a sequence; validate the sequence element using the sequence element and the value for the sequence element parameter, and in response to said validation: store said record in memory; and update the value for the sequence element parameter using the sequence element; wherein the instruction set identified by said programming request instructs the processor to use a record to program said programmable device, the processor is further configured to: identify a programming request product identifier; retrieve the stored record from memory based on identifying that the programming request product identifier matches the product identifier of the stored record; decrypt the encrypted information of said stored record using a cryptographic key stored in the memory to obtain decrypted information; output further programming information to the programming module for programming the programmable device, wherein the further programming information is based on said decrypted information.

The instruction set identified by said programming request may instruct the processor to use a record to program said programmable device, the processor may be further configured to: identify a programming request product identifier; transmit a request for a record comprising a product identifier matching the programming request product identifier; receive a record, the record comprising said product identifier; a sequence element; and encrypted information, wherein the sequence element is associated with the product identifier; query the memory using said product identifier to determine a value for a sequence element parameter that is stored in the memory in association with the product identifier, wherein the sequence element and the value for the sequence element parameter are elements of a sequence; validate the sequence element using the sequence element and the value for the sequence element parameter, and in response to said validation: update the value for the sequence element parameter using the sequence element; decrypt the encrypted information of said record using a cryptographic key stored in the memory to obtain decrypted information; and output further programming information to the programming module for programming the programmable device, wherein the further programming information is based on said decrypted information.

The programming request may comprise the programming request product identifier and the processor may be configured to identify the programming request product identifier by reading the programming request.

The data file may comprise the programming request product identifier and the processor may be configured to identify the programming request product identifier by accessing the data file.

The instruction set may comprise the programming request product identifier and the processor may be configured to identify the programming request product identifier by reading the instruction set.

The processor may be further configured to validate the sequence element by determining if a position in the sequence of the sequence element is further in the sequence than a position in the sequence of the value for the sequence element parameter.

The processor may be configured to receive the record from said programming machine.

The processor may be configured to transmit the request for a record to said programming machine.

The record may comprise encrypted content. In embodiments, the encrypted content can only be decrypted by the HSM, by using a key held by the HSM using cryptographic techniques understood by someone familiar with the art, for instance, an asymmetric private key and a derived-key decryption scheme.

When the HSM receives a record, it may be configured to validate that the sequence element is in the expected sequence (for instance it may increment).

The HSM further may be configured to determine if it is permitted to decrypt the encrypted information in the record. The HSM may determine it is permitted to decrypt the encrypted information in the record in response to successfully validating the sequence. Once the encrypted information is decrypted, the HSM is then able to use the (decrypted) information contained in the record, for instance to provision a new programmable device. Once decrypted, the value associated with the sequence parameter stored in the HSM memory against that product identifier may be updated to the next in the sequence (for instance incremented).

If the HSM stores more than one sequence element then it is advantageous if there is a product identifier associated with each sequence element. This may correspond to a product identifier in a received record and thereby allows the HSM to determine which sequence element the sequence element in the record refers to. Such a product identifier may be a product identifier stored in the memory of the security data processing device. The data file may comprise the product identifier, therefore the security data processing device may receive the product identifier by receiving the data file.

Regardless of the exact nature of the product identifier, associated with each product identifier is a sequence element parameter having a value. The value may be referred to as a sequence element value and/or a sequence value. The memory may store a product identifier (having a value/identity) with an associated value, the value being the sequence element value. In this way, the product identifier and its corresponding associated sequence element parameter may be regarded as a pair of entries. The sequence element value has a value that may comprise one or more of, one or more numbers, one or more letters, one or more other characters.

The HSM may store multiple sets of the above pairs of entries, for example, each for: different products, different OEMs, and different models of products.

In embodiments, the HSM may validate the sequence element of the new record before permitting it to be decrypted, but refuses to decrypt it if the sequence element is not validated. This results in any previously-used records being prevented from being reused. Advantageously, this provides the mechanism for an anti-cloning system, to prevent devices with identical credentials being created. It has the advantage that the HSM does not need to retain details about previous records, just the sequence element. This is advantageous because the HSM can operate with a lower memory capacity.

The HSM may be configured to retain the value corresponding to the sequence parameter in non-volatile memory, so that the value is still available for access following a power cycle (i.e. power down then up). It is advantageous if nothing outside of the HSM is able to modify the value corresponding to the sequence parameter. It is further advantageous if the only way that the value corresponding to the sequence parameter can be modified is via the described method of submitting a new record.

In response to determining that the position in the sequence of the sequence element is further in the sequence than the position in the sequence of the value, the processor is further configured to remove from the memory one or more of: any decrypted information associated with the value; and any encrypted information associated with the value.

The record may further comprise an identifier, wherein the sequence element is associated with the identifier; and the processor is further configured to: query the memory with said identifier to determine the value for the sequence element parameter that is stored in the memory in association with the identifier.

The validation may comprises determining if a position in the sequence of the sequence element is further in the sequence than a position in the sequence of the value.

The programming information may comprise the decrypted information.

The processor may be configured to process said decrypted information to generate processed decrypted information and output processed decrypted information to the programming module.

The processor may further be configured to process said decrypted information by performing one or more cryptographic operations using the decrypted information to generate said processed decrypted information.

In response to determining that the position in the sequence of the sequence element is not further in the sequence than the position in the sequence of the value, the processor may be configured to reject said record and not decrypt said encrypted information.

The processor may be further configured to: receive, from a party associated with said record, a signed instruction to replace said value in memory with an earlier sequence element that has a position in the sequence earlier than said value; verify the signed instruction using a signing key stored in memory; in response to verifying said signed instruction: update the value associated with the sequence element parameter using the earlier sequence element.

The processor is further configured to: receive, from a party associated with said record, a signed instruction to validate a specified sequence element that has a position in the sequence that is not further in the sequence than a position in the sequence of the value; verify the signed instruction using a signing key stored in memory; in response to verifying said signed instruction: validate said specified sequence element.

The processor may be configured to: receive an instruction to reset the security data processing device; generate a random number in response to received said instruction; modify the cryptographic key using the random number to obtain a modified cryptographic key; and replace the cryptographic key with the modified cryptographic key in the memory.

The sequence element may comprise one or more of: a number; a letter; and a non-alphanumeric character.

The memory may be non-volatile memory.

The sequence may be a series of ascending numbers, and said validation may comprise determining if the sequence element is greater than the value.

The sequence may be a series of descending numbers, and said validation may comprise determining if the sequence element is less than the value.

The record may further comprise a security data processing device identifier that identifies a security data processing device configured to receive the record from the programming module and the processor may be further configured to: validate the sequence element in response to determining that the security data processing device identifier matches a security data processing device identifier stored in the memory.

The sequence element may comprise a batch number and a device number, wherein the batch number corresponds to a batch of programmable devices to be programmed and the device number corresponds to a single device in the batch of programmable devices.

The sequence element may comprise the batch number appended by said device number.

The record may be signed and the processor may be further configured to verify the signature using a signature verification key stored in memory.

The record may be received from the programming module.

The identifier may identify a type of programmable device to be programmed by the programming module.

The identifier may identify a product associated with the programmable device.

According to another aspect of the present disclosure there is provided a computer implemented method, the method implemented on a security data processing device, and comprising: receiving a script comprising at least one instruction set for provisioning a type of programmable device, each of the at least one instruction set defining one or more cryptographic operations to be performed by the security data processing device, each of the one or more cryptographic operations referring to a parameter; storing the script in a memory of the security data processing device; retrieving a first authorization key from said memory and verify a signature associated with the script using the first authorization key, wherein the script is signed by a producer of the script; receiving a programming request from a programming module of a programming machine in communication with said processor, said programming request requesting the programming of a programmable device and identifying an instruction set of the least one instruction set in said script; for each of the one or more cryptographic operations in the identified instruction set, determining a value for the parameter referred to in the cryptographic operation and performing the cryptographic operation using the value; and in response to performing each of the one or more cryptographic operation, outputting programming information to the programming module for programming the programmable device.

According to another aspect of the present disclosure there is provided a computer-readable storage medium comprising instructions which, when executed by a processor of a security data processing device cause the security data processing device to perform the method steps described herein.

The instructions may be provided on a carrier such as a disk, CD- or DVD-ROM, programmed memory such as read-only memory (Firmware), or on a data carrier such as an optical or electrical signal carrier. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

A description of example embodiments follows.

Embodiments will now be described by way of example only.

Figure 1:
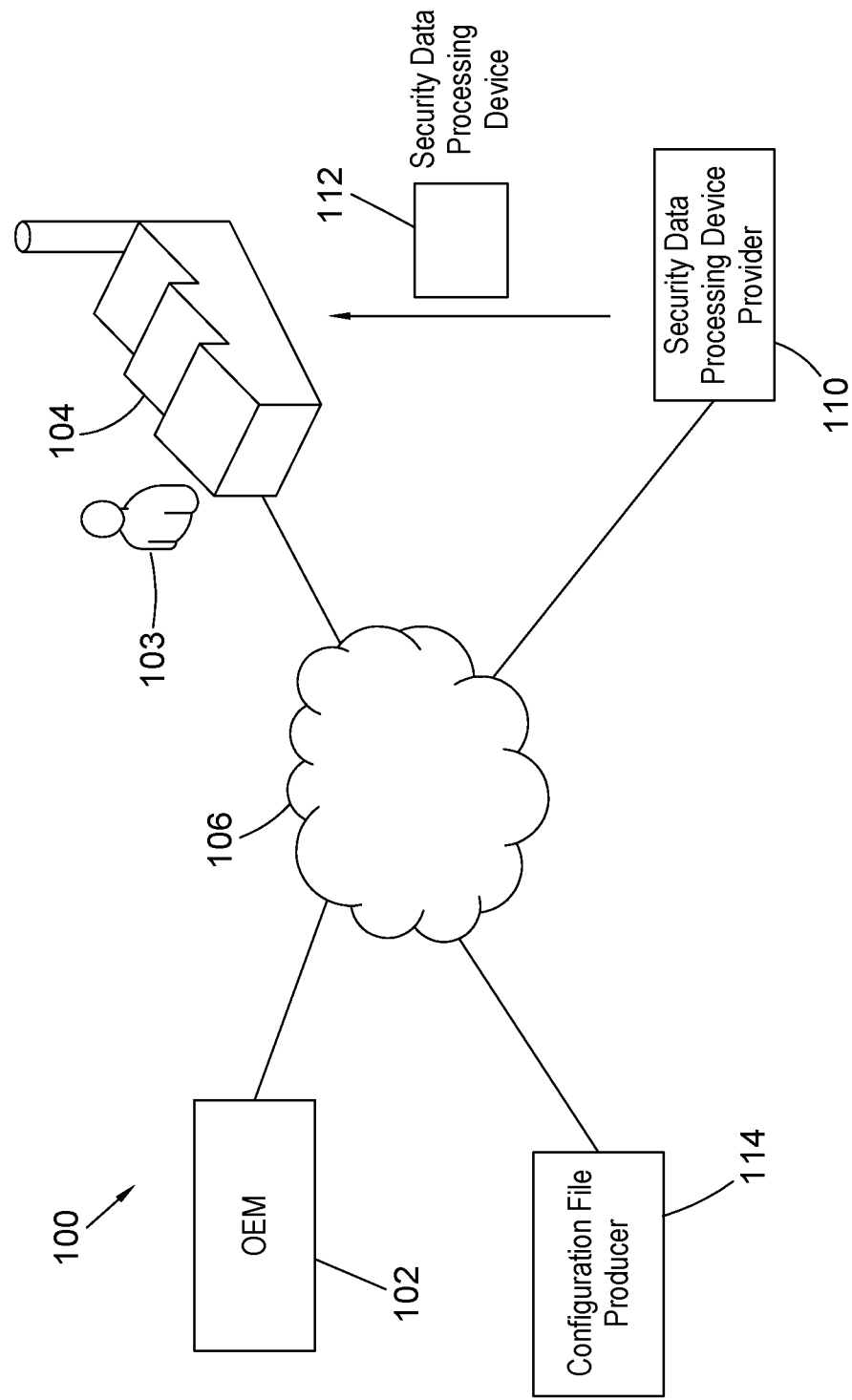
FIG. 1 is schematic block diagram of a system.

FIG. 1 illustrates a system 100 comprising a configuration file producer 114 coupled to network 106 (e.g. the Internet). The configuration file Producer 114 produces a configuration file. During the production of the configuration file, the configuration file producer 114 may be in communication with OEM 102. The OEM 102 can create a data file.

A security data processing device provider 110 provides a security data processing device 112 (otherwise referred to herein a "Hardware Security Module", which may be abbreviated to "HSM") to a first manufacturing party 103 for use in its manufacturing environment 104, which may be a factory or other type of production facility.

The first manufacturing party 103 may manufacture programmable devices under their own specifications. Alternatively, the first manufacturing party 103 may manufacture programmable devices on behalf of a second manufacturing party 102 in the form of an Original Equipment Manufacturer (OEM) 102, in these scenarios the first manufacturing party 103 acts as a contract manufacturer.

Embodiments are described below with reference to a scenario whereby an OEM 102 contracts with the contract manufacturer 103 to manufacture programmable devices on their behalf, however it will be appreciated that this is merely an example and the security data processing device 112 described herein may be employed by the first manufacturing party 103 in alternative ways.

Figure 2:
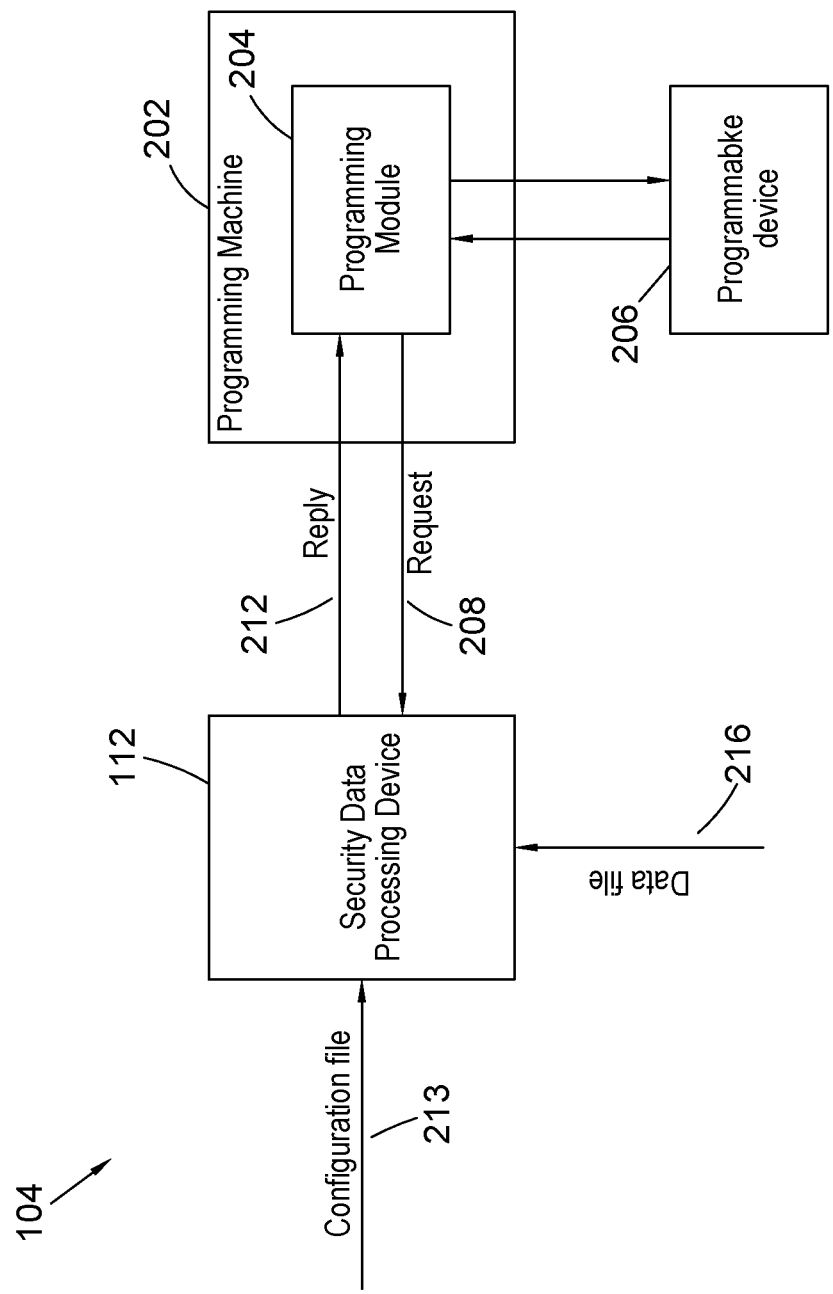
FIG. 2 is a schematic block diagram of a security data processing device in communication with a programming machine in a manufacturing environment.

The security data processing device 112 is configured to be coupled to a programming machine located in the manufacturing environment 104, this is illustrated in FIG. 2.

As shown in FIG. 2, the manufacturing environment 104 comprises the security data processing device 112 and a programming machine 202.

The security data processing device 112 is configured to be coupled to the programming machine 202. The security data processing device 112 may be coupled to the programming machine 202 by way of a wired connection. Alternatively, the security data processing device 112 may have an interface so that it can plugged into a suitable interface on the programming machine 202.

The programming machine 202 comprises a programming module 204 that is configured to program programmable devices. In other words, the programming machine inputs, or 'programs', software, cryptographic keys and other digital information onto a memory of a programmable device 206. The programmable device 206 may be for example a silicon chip, microprocessor or microcontroller.

Whilst a single programmable device 206 is shown in FIG. 2 for simplicity, the programming machine 202 is able to program thousands of programmable devices 206 during a programming operation.

The security data processing device 112 is configured to receive a configuration file 213, via a wired or wireless communication link. The configuration file 213 is generated by the configuration file producer 114. Preferably, the security data processing device 112 receives the configuration file 213 from the configuration file producer 114 but the configuration file 213 may alternatively be received from the OEM 102, the first manufacturing party 103, or another party (not shown). Optionally, the security data processing device 112 may send a reply to confirm reception of the configuration file. The reply may be a mere confirmation that the configuration file has been received, or may contain, for example, an error message indicating that the configuration file is invalid. The configuration file may be invalid because there is not an acceptable authorization associated with the configuration file. Other reasons for the configuration file being invalid are that the configuration file is incomplete, i.e. there is information missing, which means that the configuration file cannot be used to by the security data processing device 112 to reply to a request 208.

The security data processing device 112 is configured to receive a data file 216, via a wired or wireless communication link. The data file 216 is generated by the OEM 102 Preferably, the security data processing device 112 receives the data file 216 from the OEM 102 but the data file 216 may alternatively be received from another party, for example the configuration file producer 114.

Upon being loaded into the programming machine 202, a programmable device 206 communicates with the programming module 204.

The programming module 204 is configured to transmit request 208 to the security data processing device 112. The request 208 may be a request for programming information needed to program a programmable device 206. In response to the request 208, the security data processing device 112 is configured to determine how to fulfil the request 208, and whether or not to fulfil the request 208. In response to these determinations, the security data processing device 112 is configured to send a reply 212 to the programming module 204. If the request 208 is a request to program a programmable device then the reply 212 may either comprise information required by the programming machine 202 to program the programmable device 206 (i.e. programming information) or a refusal message indicating that the security data processing device 112 has refused to send the required programming information.

Figure 3:
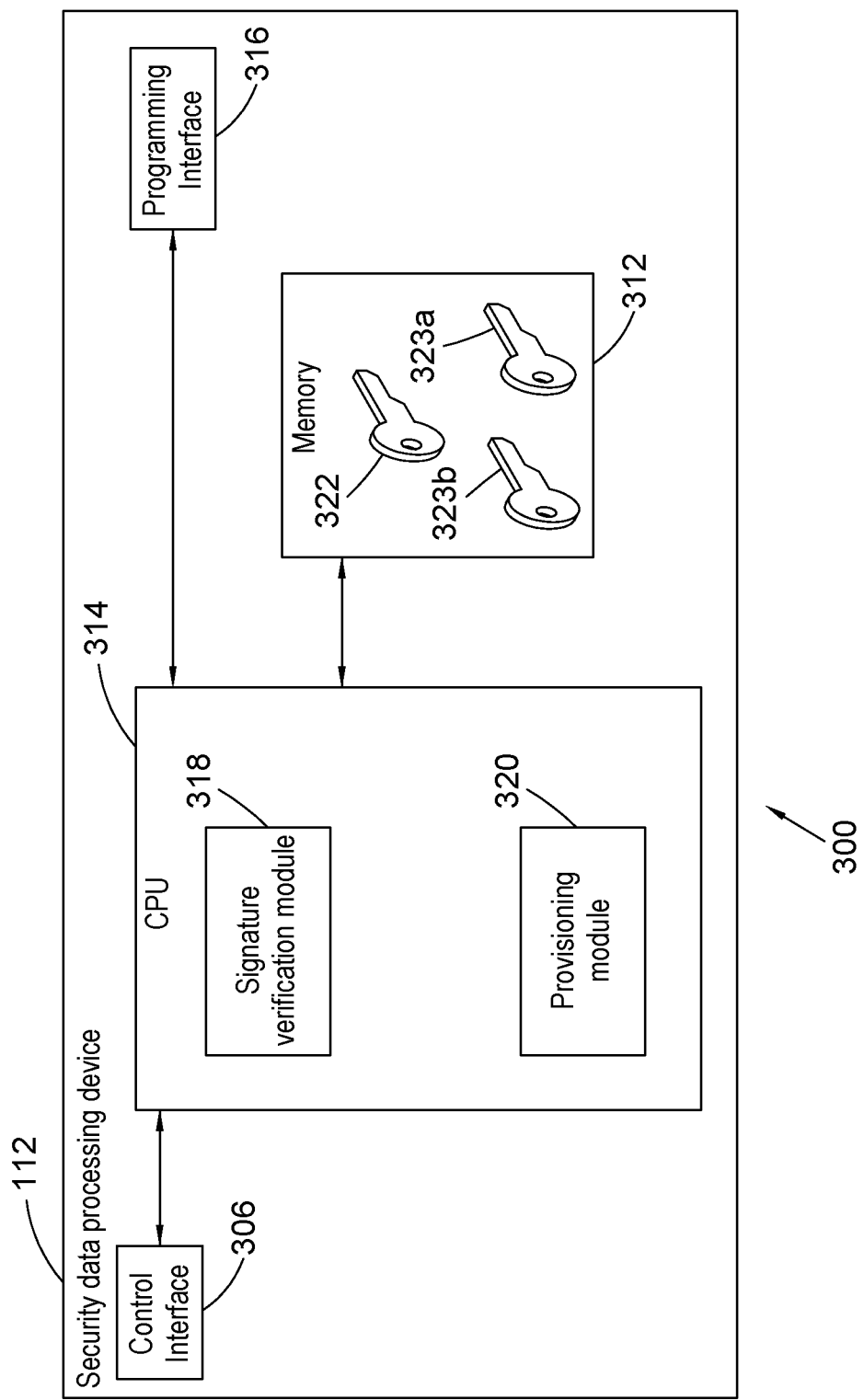
FIG. 3 is a schematic block diagram of a security data processing device.

FIG. 3 shows a block diagram of a security data processing device 112.

The security data processing device 112 may have physical restrictions that prevent unauthorized parties from tampering with the security data processing device 112 or from obtaining information from it. The security data processing device 112 comprises a CPU 314, a programming interface 316, control interface 306 and memory 312. Control interface 306 is configured to receive a configuration file. The communication may be wired or wireless. Control interface 306 may further be configured to receive a data file. The programming interface 316 is configured to receive a request from programming machine 202. The communication may be wired or wireless.

The Memory 312 may comprise an OEM unwrapping key 322. The OEM unwrapping key 322 is used by the provisioning module 320 to decrypt any encrypted ('wrapped') values in a data file 216 that have been encrypted by OEM 102 using an OEM encrypting key (not shown). The OEM encrypting key and the OEM unwrapping key 322 may be an asymmetric key pair, alternatively, symmetric key methods may be used. For example, the OEM unwrapping key 322 can be used to decrypt the value 'wrappedVal' in FIG. 5.

The memory 312 comprises producer authorization key 323a. The producer authorization key 323a is used by the signature verification module 318 to verify a received configuration file 213. The memory 312 may further comprise an OEM authorization key 323b, which is used by the signature verification module 318 to verify a received data file 216. Further details of this process will be discussed later in the specification.

The CPU 314 is coupled to the programming interface 316, the control interface 306, and the memory 312. The CPU 314 comprises a signature verification module 318, which can verify a signature of, for example, the configuration file 213 and data file 216. The CPU 314 comprises a provisioning module 320 which is configured to respond to a request received from the programming machine 202. Non-limiting examples of operations that the provisioning module 320 can perform when responding to a request received from the programming machine 202 are signing a certificate, encrypting information, and decrypting information. Generally speaking, security data processing device 112 can comprise processing ability, including hardware-based crypto-acceleration. The security data processing device 112 is configured to receive the data file 216 and configuration file 213 via the control interface 306, store data file 216 and configuration file 213 in memory, and verify the signature chain of each (the signatures must be good, and the certificates chain links back to the trusted certificate), then check all the required items in the metadata 408 have been provided (by the OEM) in the data file 216. The security data processing device 112 only proceeds if the checks are good.

Figure 4:
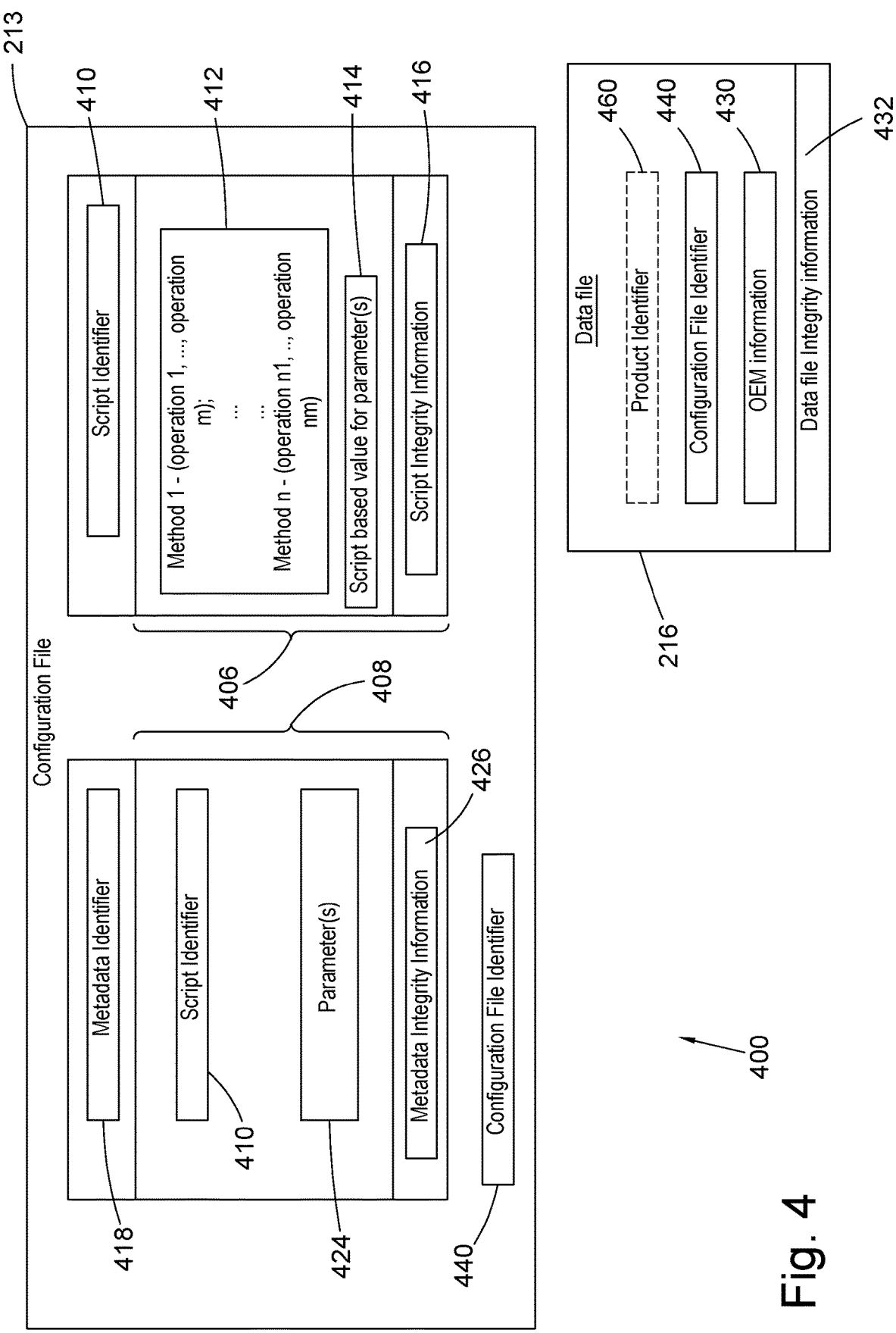
FIG. 4 is a block diagram of a configuration file and a data file.

FIG. 4 shows an example configuration file 213, and a data file 216. The configuration file 213 comprises a script file 406 and optionally a metadata file 408. In this sense, the configuration file may be divided into two logical parts:

1) the metadata file 408 specifies parameter(s) 424. The parameter(s) may be associated with (i) a value (possibly encrypted) (ii) an instruction to the security data processing device 112 to generate a value for the parameter, or (iii) an instruction to the security data processing device 112 to insert a value for the parameter from the OEM information 430 of the data file 216. In other words, the parameter(s) 424 may be a reference to data that can be found in the data file 216 (specifically at the OEM information 430), if this is the case then metadata file 408 is read by the security data processing device 112.

2) The script file 406 comprises one or more instruction sets 412, each instruction set defining one or more cryptographic operations to be performed by the security data processing device 112 during provisioning of a programmable device. Each cryptographic operation refers to one or more parameters. A value for a parameter may be defined in the script 406 (contained in the information block 'Script based value for parameter(s) 414'). Alternatively, a parameter can be defined in the metadata 408 (e.g. in the 'parameter(s)' 424). An example of a cryptographic operation in an instruction set may be to sign a certificate using a signing key (with the cryptographic operation referencing a signing key parameter) and to insert the signed certificate into a specific location in memory of the programmable device 206.

The configuration file 213 maintains its integrity on the journey between the configuration file producer 114 and the security data processing device 112 by using cryptographic integrity signatures (Metadata Integrity Information 426 and Script Integrity Information 416) to ensure that no part of the configuration file 213 (for example the one or more instruction sets 412, script based value for parameter(s) 414, and metadata 408) is modified in transit or while residing on the manufacturing environment 104 (for example, whilst residing in security data processing device 112). The integrity of the configuration file is provided by the configuration file producer 114 being assigned a 'producer signing certificate' against 'producer signing key' held by the configuration file producer 114. The 'producer signing certificate' is signed by a Public Key Infrastructure (PKI) Hierarchy that belongs to the Security Data Processing Device Provider 110, so that the security data processing device 112 can validate the chain of certificates in the Metadata Integrity Information 426 and Script Integrity Information 416. For example, the configuration file producer 114 would create a secret key (for example, inside a Trusted Platform Module, TPM) and then generate a Certificate Signing Request (CSR). The CSR is sent by the configuration file producer 114 to an authorized Registration Authority (RA) to create a Producer Certificate. The RA will ensure the configuration file producer 114 is authorized before providing a Certificate to the PKI Hierarchy of the security data processing device 112. The RA may be the security data processing device 112 PKI Hierarchy or alternately be cross-certified to the security data processing device 112 PKI Hierarchy, but can provide certificates authorized to the PKI Hierarchy. This is advantageous because it stops any unauthorized party from creating or modifying a configuration file 213. In embodiments where the configuration file 213 does not comprise Metadata 408, then the integrity of the configuration file is maintained by script integrity information 416.

In embodiments where there is no metadata provided, the security data processing device 112 may be configured to receive script 406 rather than configuration file 213. In other embodiments, the security data processing device 112 is configured to receive the metadata 408 and script 406 separately.

In other words, in embodiments the configuration file producer 114 signs the entire configuration file 312 using a producer signing key. The signature verification module 318 can verify the signature using producer authorization key 323a.

Additionally, or alternatively, the configuration file producer 114 may sign the script 406 using a script signing key to produce the script integrity information 416 and then separately sign the metadata 408 using a metadata signing key to produce the metadata integrity information 426. In embodiments, the metadata signing key and the script signing key are the same key (and thus may be referred to as the producer signing key) and therefore the signature verification module 318 can use the producer authorization key 323a to verify both the Metadata Integrity Information 426 and to verify the Script Integrity Information 416. In other embodiments, the metadata signing key and the script signing key are different keys, in these embodiments, the memory 312 comprises a separate metadata authorization key and script authorization key, which are used to verify the Metadata Integrity Information 426 and the Script Integrity Information 416 respectively.

Parts of the configuration file 213 (for example the one or more instruction sets 412, script based value for parameter(s) 414, parameter(s) 424) may be separately encrypted to obscure the contents. Advantageously this makes it more difficult for an attacker to understand then attempt to modify, a configuration file 213 in transit. In this case, the memory 312 will comprise a 'producer unwrapping key' (not shown) to decrypt any information in the configuration file that has been encrypted by the configuration file producer 114 using a 'producer wrapping key'. This is particularly advantageous in embodiments where the metadata 408 comprises a parameter associated with a value rather than a parameter associated with an instruction to obtain or generate a value for the parameter. There is increased security if the configuration file producer 114 encrypts a value for a parameter using the 'producer wrapping key'. In this embodiment, the memory 312 will need a 'producer unwrapping key' (not shown) to decrypt the encrypted value for a parameter. The 'producer wrapping key' and 'producer unwrapping key' may utilize either symmetric or asymmetric cryptography to achieve the encryption. An advantage of encrypting the script (and/or metadata) is to hide the Intellectual Property Rights of the provisioning mechanism used to provision (program) the programmable device 206. This is advantageous because the Intellectual Property Rights of the provisioning mechanism may be able to be deduced by a malicious third party from the script (specifically the one or more instruction sets).

In embodiments, a role of the metadata 408 is to define a parameter which is associated with a value contained in the OEM information 430, where the OEM has injected the value for the parameter into the data file 216. A parameter may be associated with keys, certificates, credentials, trusted public keys, and other data required to: support unique authentication of the programmable device 206 once the programmable device 206 has been programmed; and/or securely upgrade the programmable device's 206 application software. The OEM may provide OEM information 430 (which may be unique to the OEM) either directly onto the data file 216, or may provide the OEM information 430 to the manufacturing environment 104 for eventual insertion onto the security data processing device 112. In embodiments, the configuration file and the data file 216 are received by the security data processing device 112 as one file. In other embodiments the configuration file and the data file 216 are received by the security data processing device 112 are received separately, this embodiment is shown in FIG. 2.

The data file 216 may also have the Data File Integrity information 432 added by the OEM. The data file 216 may be signed by the OEM 102 using an OEM signing key to produce the Data File Integrity information 432. The signature verification module 318 can verify the Data File Integrity information 432 by using the OEM authorization key 323a which is stored in memory 312. Additionally, or alternatively, the Data File Integrity information 432 may be a certificate chain authorizing the OEM 102 for the security data processing device 112.

Some of the values for parameters contained in the OEM information 430 may be "wrapped" using an OEM encrypting key (not shown) held by the OEM. The security data processing device (112) can decrypt any OEM information 430 by using the OEM unwrapping key 322 stored in the memory 312. This is advantageous because only the targeted security data processing device(s) 112 can unwrap and use any 'wrapped' OEM information because the security data processing device 112 has the OEM unwrapping key 322. In embodiments, symmetric keys are used by the security data processing device 112 for wrapping of OEM information and therefore the OEM unwrapping key 322 is the same key as the OEM encrypting key. In other embodiments, asymmetric key methods are used and therefore the OEM unwrapping key 322 is the private key and the OEM encrypting key is the corresponding public key.

The configuration file 213 is created by the configuration file producer 114. As an example, the configuration file producer 114 designs the metadata file 408 by defining parameter(s) 424 that have been introduced in one or more operations of the one or more set of instructions 214. The configuration file producer 114 further designs a method of presenting options relating to the parameter(s) 424 in a GUI, where the presenting refers to the presentation to the OEM 102 when the OEM 102 is creating the data file 216. In other words, when the OEM 102 is creating a data file 216, the OEM may run metadata 408 to ensure that the data file 216 and metadata 408 will function together. In embodiments, the metadata 408 may provide visual indicators and prompts that generally provide assistance to the OEM 102 when creating the data file 216. In embodiments, an operation of an instruction set instructs the provisioning module 320 (of the security data processing device 112) to use a value for a parameter in order to provision one or more programmable devices (206). Advantageously, an instruction set can constrain the use of the parameter(s) 424 to only the proscribed operations within the instruction set.

When the Configuration file producer 114 completes the script file 406 (and optionally metadata 408) for: a new type of programmable device (e.g. a new 'model' of a programmable device); a new OEM; and/or a new use, the completed script file (alongside the optional metadata 408) forms a new configuration file 213.

The Configuration File Producer 114 then signs the configuration file 213 to protect its integrity, preventing it from being modified by a third party. In one embodiment, the Configuration File Producer 114 signs the entire configuration file.

Additionally, or alternatively, the script file 406 may be signed (Script Integrity Information 416) and the metadata 408 may be signed (Metadata Integrity Information 426). In more detail, the signed script file 406 is given an identity (Script Identifier 410), which may be from a hash value of the script file 406. The Script Identifier 410 is included in the metadata 408 prior the signing of the metadata 408, thus advantageously providing a link between the metadata 408 and script file 406. The signing of the metadata 408 is Metadata Integrity Information 426. Therefore, in this embodiment, the Configuration File Producer's (114) signature is applied separately to the metadata 408 and the script file 406, however, in embodiments the Configuration File Producer's (114) signature is applied as a single signature of both the metadata 408 and the script file 406.

FIG. 4 shows metadata identifier 418 and script identifier 410 appended to the metadata 408 and script 406 as headers. Although this is shown in FIG. 4, this is an optional feature and metadata identifier 418 and script identifier 410 may not be appended to the metadata 408 and script 406 as headers.

When completing the signing process, the Configuration File Producer 114 uses a producer signing key, for instance held within a Trusted Platform Module, and is authorized by a hierarchy of X.509 Certificates. The Certificate hierarchy the Configuration File Producer 114 uses links back to a trusted certificate provided by the security data processing device provider 110, or one that is lodged in the security data processing device 112 as a trust-worthy certificate for Configuration files.

The configuration file 213 can comprise a Configuration File Identifier 440, unique to all extents and purposes, which may be used to identify the configuration file 213 in catalogues and lists and within the manufacturing environment 104 during manufacture. The integrity of this identifier may be validated from the Configuration file by validating the signature, the certificate chain of both metadata and script and the hash of the script and metadata. The Configuration File Identifier 440 may be a hash of the signed metadata, this is advantageous because the signed metadata 408 comprises the script identifier 410 (which may be a hash of, or other reference to, the script file). Therefore, having the Configuration File Identifier 440 as a hash of the signed metadata means that the Configuration File Identifier 440 relates to both the metadata 408 and the script file 406.

If the Configuration File Identifier 440 is a hash of the signed metadata then it is not necessary for the configuration 213 file to comprise a separate Configuration File Identifier as shown at 440 but may instead rely on the metadata identifier 418 (as shown in FIG. 4 (item 418) as a header to the metadata 408) as a configuration file identifier. In other words, where the metadata identifier 418 is to be a configuration file identifier, there may not be a separate Configuration File Identifier as shown in 440. The Configuration File Identifier can be algorithmically generated (e.g. using a SHA-256 hashing of the signed content), alternatively the Configuration File Identifier is explicitly included in the signed content. This ensures that the Configuration File identifier cannot be modified without detection.

Regarding the data file 216, the OEM 102 may sign the data file 213 using an OEM signing key. The OEM signing key is held by the OEM 102. The OEM signing key may be supported by a certificate chain that the security data processing device 112 can validate using the OEM authorization key 323b. The signed data file is shown as data file integrity information 432. The file integrity information 432 is validated by the security data processing device 112, advantageously ensuring that no one can successfully modify the data file 216 either in transit or in storage without invalidating the data file integrity information 432. The data file 216 contains the configuration file identifier 440, which may be the hash or fingerprint of the configuration file with which it is to be used. Likewise, the configuration file may be signed by the configuration file producer 114 so that the security data processing device 110 can determine reliably that the information contained in the configuration file has not been tampered with.

The data file 216 may comprise a product identifier 460. The product identifier 460 may be used in embodiments where a record is received to provide enhanced security, as discussed later. The product identifier 460 may be referred to as a programming request product identifier.

Block diagram 5 illustrates an example configuration file 213, an example data file 216, and an example programmer script 542.

Figure 5:
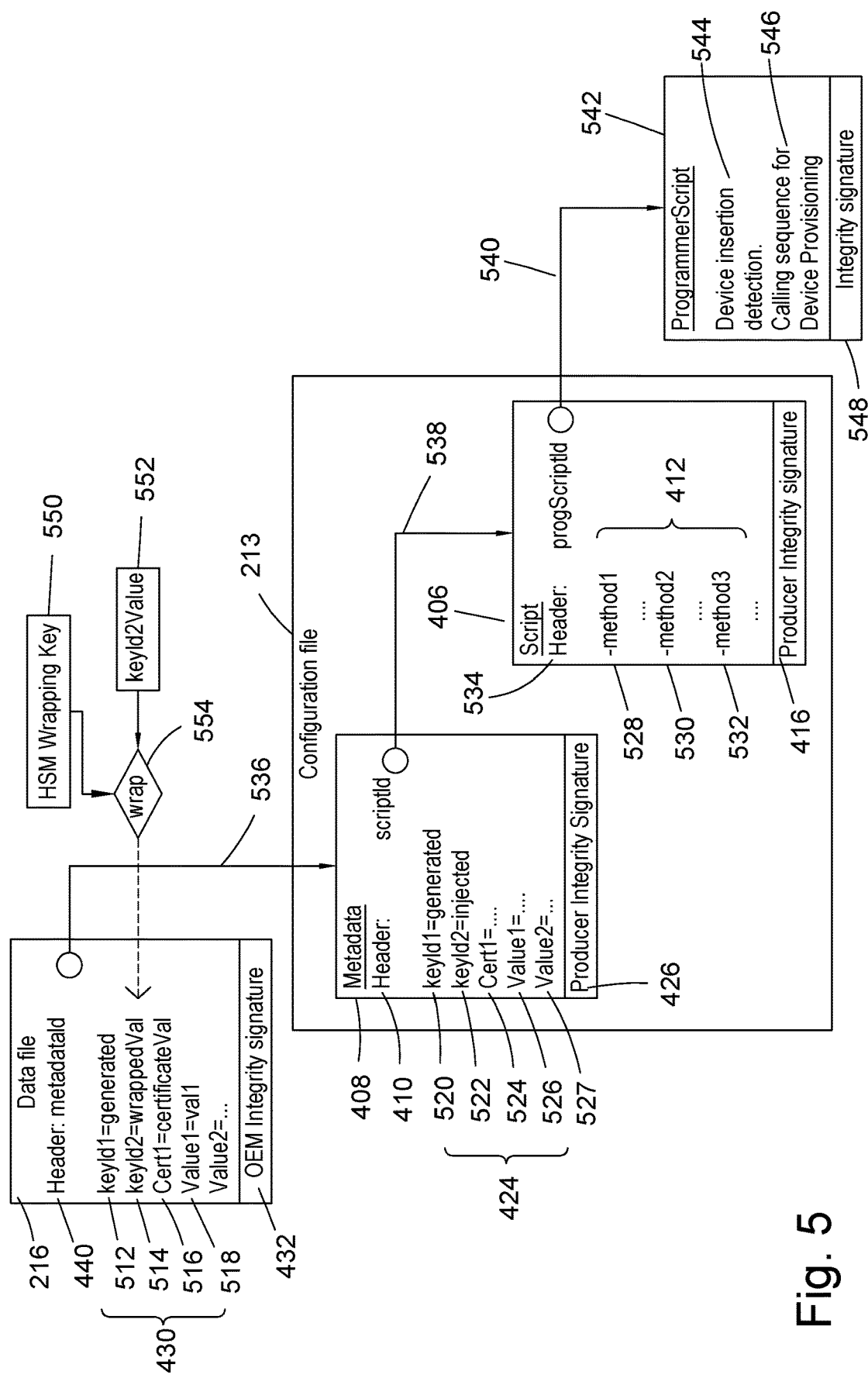
FIG. 5 is a block diagram of files received by the Security Data Processing Device.

In FIG. 5, the script 406 comprises three instructions sets: 528, 530 and 532 (e.g. 'method1' 528, method2 530 and method3' 523), which are shown collectively as 412. In embodiments, script 406 may comprise a single instruction set. An instruction set comprises one or more operations (not shown). An operation comprises one or more parameters. The security data processing device 112 may obtain a value for each parameter in various ways including:

receiving a value for a parameter in the request 208. As stated above, request 208 may be a request to program a programmable device 206.

obtaining a value for the parameter using information contained in the script that associates a value with a parameter (shown in FIG. 4 as the information block 'script based value for parameter(s)' 414, although there may be more than one value stored in 'script based value for parameter(s)' 414).

obtaining a value for a parameter using information in the Metadata 408. The Metadata 408 comprises information that associates a parameter with any of:
a value,
an instruction for the security data processing device 112 to generate a value; and
an instruction to inject a value from data file 216.

For example, parameter 520 'keyId1' is associated with an instruction for the security data processing device 112 to generate a value for the parameter 'keyId1', this association is shown by the text 'generated' next to the 'keyId1'. This is further reflected in the data file 216 at 512, which shows that the parameter 'keyId1' is to be 'generated'. In a further example, the parameter 'keyId2' 522 is associated with an instruction to inject a value from the data file 216. This association is represented by the text 'injected' next to 'keyId2' 522. The value to be injected can be seen at 514 which shows that 'keyId2' equals a 'wrappedVal' that has been inserted by the OEM 102 during creation of the data file 216. A further example is the parameter 'Cert1' 522, which is a parameter defining a certificate. In this example, the certificate associated with 'Cert1' 522 is contained in the metadata (not shown explicitly but instead represented by . . . ' next to 'Cert1' 522). A further example is the parameter 'Value1', in this example, the parameter 'Value1' is associated with a value contained in the metadata (the explicit value is not shown in FIG. 5 but is instead represented by the . . . ' to the right of 'Value1'. One or more sensitive keys in the data file (e.g. the value 'wrappedVal' associated with the parameter 'keyId2' 514) will be wrapped by the OEM using the OEM encrypting key and can be decrypted by the security data processing device 112 by using the OEM unwrapping key 322.

The Metadata 408 may also give presentation information (not shown in FIG. 5) so that a software tool can be used to generate suitable input information (for instance telling the OEM 102 what each key is used for). The metadata 408 may have simple variables that allow the programming of multiple programmable devices 206 to be varied for each programmable device 206, for instance a variable might say whether there are 1 or 3 secret keys provisioned in the programmable devices 206 and require the entry of values as appropriate.

The Script file 406 comprises a group of instruction sets 412, comprising one or more instruction sets (each of 528, 530, 532 are an instruction set), each instruction set has one or more operations (not shown) that may use a simple programming language to provide flexible data manipulation, and use a well-defined API to permit operations on keys, credentials, certificates, signature, and verifications.

Advantageously, the API prevents the configuration file producer from accessing and revealing keys and secrets that should not be exposed.

The metadata 408 is cryptographically bound to the script 406 (shown as arrow 538) as part of the signing operation discussed above (i.e. metadata 408 comprises script identifier 410, where the script identifier may be a hash of the signed script file). Similarly, script file 406 can refer to a Programmer Script 542 by comprising a programmer script identifier 534, this link is shown by arrow 540. Programmer Script 542 is not implemented on 112 but is instead intended to be run by the programming machine 202, preferable on the programming module 204. For example, in the embodiment shown in FIG. 5, the programmer script 542 comprises Device insertion detection routine 544 and 'calling sequence 546 for device provisioning' which may be run by the programming module 204. Similarly, and as mentioned in more detail elsewhere in reference to FIG. 4, the configuration file is cryptographically bound to the data file 216 (as shown in arrow 536) because the data file 216 comprises the configuration file identifier 440 (which may be the metadata identifier 418) prior to the signing of the data file by the OEM 102.

Each parameter in the metadata 408 may be associated with (i) a value (possibly encrypted) (ii) an instruction to generate a value for the parameter, or (iii) an instruction to insert a value for the parameter from the data file 216. Parameters may be explicitly associated with a value, or stated as a value to be generated (e.g. 520), or stated as a value to be injected (e.g. 522) from data file 216. A parameter may represent an asymmetric public or private keys (520, 522) (i.e. symmetric secrets), credentials, a Template Certificate, a Certificate (524), a value (526, 527), and data (not shown) that is not secret but required to provision the device. Data file 216 is only deemed to be complete if the data file 216 provides values for all of the parameters that the metadata 408 requires. The required parameters may vary dependent on the contents of 408 (for example 424): for instance, one metadata file 408 may one parameter as a key whilst another metadata file may define 3 parameters as keys. Secret and private keys may be provided in wrapped format, using the security data processing device's 112 OEM unwrapping key 322 so that only the target security data processing device(s) 112 may unwrap them.

A value (e.g. 'keyId2Value 552') for one or more of the parameters (e.g. the 'keyId2' 514) defined in the data file may be wrapped by the OEM 102 using an HSM wrapping key 550 (otherwise referred to as an OEM encrypting key). This is shown in the 'wrap' operation 554, where the 'HSM Wrapping Key' 550 (otherwise referred to as an OEM encrypting key) is used to encrypt the value 'keyID2Value' 552. The wrapped 'keyID2Value' 552 is equal to the 'wrappedVal' of the data file. The security data processing device 112 is provided with the OEM unwrapping key 322 that enables the security data processing device 112 to open any wrapped value. The 'HSM wrapping key' 550 may be a symmetric key in which case the security data processing device 112 is provided with a corresponding symmetric key (i.e. the OEM unwrapping key 322). Alternatively, the HSM wrapping key 550 may be a public key of a wrapping key pair with the private key of the wrapping key pair being installed on the security data processing device 112 (i.e. the OEM unwrapping key 322).

Figure 6:
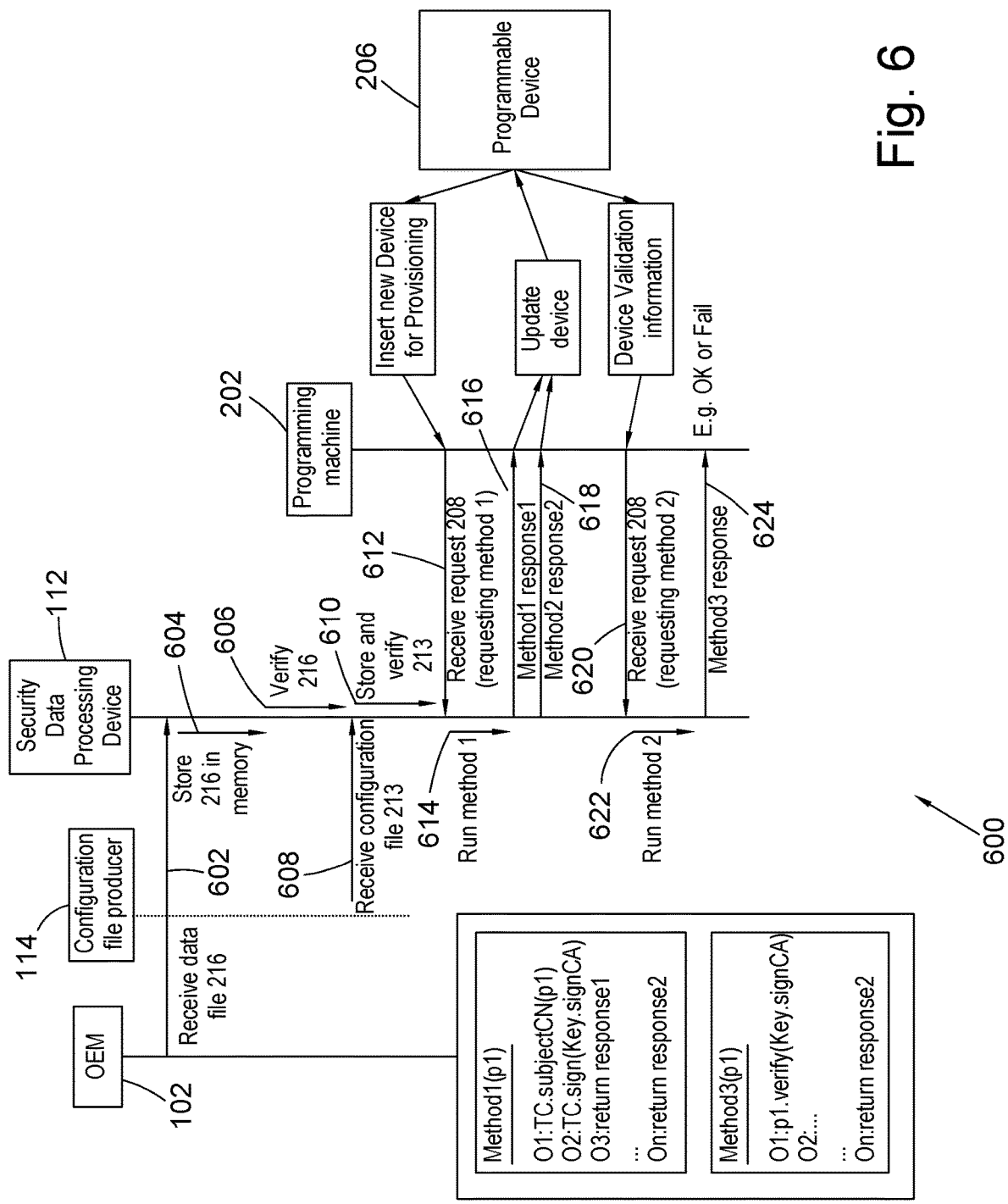
FIG. 6 is a schematic flow diagram showing steps performed by the Security Data Processing Device.

FIG. 6 is a schematic flow diagram 600 showing steps performed by the Security Data Processing Device 112 in an embodiment of the invention.

The Script can provide a number of high level method entry points, each may require extra parameter data to be provided by the programming module 204, for instance serial number of the new programmable Device 206, which the programming module 204 can extract as necessary from the programmable Device 206.

The data file 216 and configuration file 213 are received (steps 602 and 608) by the Security Data Processing Device 112, either separately or independently of each other. Optionally, and as shown in FIG. 6, the data file is received from the OEM 102 and the configuration file is received from the configuration file producer 114. The Security Data Processing Device 112 then stores and verifies both the data file 216 and configuration file 213 in steps 604, 606, 610. In other embodiments, the Security Data Processing Device 112 may not store the data file 216 but instead the data file 216 is stored elsewhere and the Security Data Processing Device 112 merely accesses the data file 216.

Optionally, an instruction is received by Security Data Processing Device 112 from the OEM 102, to provision a programmable device 206.

At step 612, the Security Data Processing Device 112 receives an indication from the programming machine 202 indicating that a new programmable device 206 is ready to be provisioned. The programming module 204 of the programming machine 202 will call an instruction set 528 in script 406 (as determined by the Programmer Script 542) alongside providing the Security Data Processing Device 112 with any necessary parameter data. Although FIG. 600 shows that 'method1' has been called first by the programming machine 202, in embodiments other instruction sets such as 'method2' 530 or 'method3' may be called first by programming machine 202. The Security Data Processing Device 112 receives (612) the request for an instruction set (and any parameter data contained in the request) and performs the operations stated by that instruction set (614). This may involve operations, for example, such as modifying a Certificate Subject Common Name field of a Template Certificate to the Device serial number, then signing the Device Certificate, then providing the certificate back (616, 618) to the programming machine to be programmed into the programmable device 206.

In embodiments, and depending on the complexity required to program the particular programmable device, there may be several calls to other instruction sets received by the Security Data Processing Device 112, as shown in step 620. In this example, the second instruction set call (620) will be a request to verify that the programmable device 206 has been correctly provisioned. In response to receiving request 620, the Security Data Processing Device 112 runs the instruction set (622) corresponding to the request and returns a response (624).

In a further embodiment, the first request comprises a request to load and run a program within the programmable device 206 which initializes the programmable device 206 for secure operation and further creating a private key within the programmable device 206 that is not known outside the programmable device 206. In this embodiment, a second request can then be communicated securely between the Security Data Processing Device 112 and a program running on the programmable device 206, thus allowing the Security Data Processing Device 112 to pass encrypted values directly to the program running on the programmable device 206 to complete the provisioning without the risk of the programming machine being able to determine the data transmitted between the Security Data Processing Device 112 and the programmable device 206.

Advantageously, the use of a configuration file allows an OEM 102 to trust the manufacturing environment 104 to manufacture repeat products in a stable manner. The manufacturing environment 104 can install the equipment (i.e. security data processing device 112) and then are able to use the same equipment to provision new programmable devices 206 that were not even available when the equipment (i.e. security data processing device 112) was installed. The methods described using the configuration file allows this to happen.

Creation of a Configuration file may be performed by an experienced security-trained Producer for a specific IoT device to a specific OEM requirement for provisioning. As described, the Configuration file is used in provisioning of new IoT devices during manufacture.

As described, a Configuration file is validated by the security data processing device 112 by checking the integrity signatures are good and the certificate chain links the Producer's certificate back to one of the security data processing device 112 manufacturer's certificate or several Trusted Certificates (such as a Root certificate).

A Programming module can indicate the presence of a new programmable Device 206 to be provisioned, possibly providing some information about the programmable device 206 (such as serial number and public key). This can be seen as calling an instruction set (of the script) within the security data processing device 112, and may result in the security data processing device 112 processing information and providing credentials to the programming module 204 to provision the programmable device 206. One or more messages maybe returned to the programming module 204 by the instruction set. Additional instruction sets may be called by the programming module 204, for instance a verification instruction set to ensure that the programmable device 206 is correctly provisioned. Such a verification instruction set might give the programmable device 206 a challenge and validate the response using secrets and keys held within the security data processing device 112. An initial instruction set might be used to verify that the programmable device 206 is a new empty programmable device 206 and has not already been provisioned.

As described above, a metadata file and a data file can be used to program multiple programmable devices. For example, a value contained in a data file can be programmed onto multiple programmable devices.

In embodiments, the processor may further receive a record. The record comprises information that is only programmed onto one programmable device rather than programmed onto multiple programmable devices, as explained in more detail below, this is controlled by way of a sequence element contained in a record. Embodiments in which the processor further receives a record can further protect against clone production of programmable devices. In one embodiment, the record is received at the security data processing device 112 before the processor receives a programming request (for example the request 208). In another embodiment, the record is requested and received at the security data processing device 112 in response to receipt of a programming request (e.g. request 208). We describe this in further detail below.

The OEM 102 can create or obtain multiple per-device credentials in its own facility or safe room. This may be for instance from a commercial Certificate Authority, or from its own certificate authority or using a standard HSM. The OEM 102 individually prepares per-device records (one record per device) where the secret or confidential items are encrypted to a particular Factory HSM wrapping key so that the secrets can only be unwrapped on the particular HSM that was intended to receive the record. The OEM 102 may include in the record a unique sequence number (for instance starting from 1 and incrementing), and the identity of the script and/or the data file and/or the configuration file that is to be used in association with the record. The OEM 102 may also individually sign the record with its own secret asymmetric key. The public key is securely given to the HSM.

Generally, the HSM receives an individual record for the provisioning of each programmable device. The HSM validates that the record has been signed by the OEM 102 and unwraps any encrypted information contained in the record, as only the HSM has the unwrapping key. In embodiments, the HSM validates that the sequence element in the record has not been used before by comparing it with its own sequence count, for instance that it is bigger than the last sequence element used. If the validation fails, the HSM refuses to use the credentials in the record for provisioning of the device. If the validation succeeds, it uses the record credentials, unwrapping secrets as required, to provision the programmable device.

Advantageously, as the sequence element cannot be re-used, the OEM 102 is protected against the factory 104 accidentally, or purposefully, using credentials in the record for one device more than one times.

The overall authority for providing the credentials belongs to the OEM 102, not to the Factory 104, so, advantageously, the OEM 102 does not even need to have to trust the Factory 104 to keep its secrets, because the Factory 104 cannot use credential from each record more than once on the chosen product.

The Factory 104 may return the sequence element (and a batch sequence element if used) of each device it has provisioned in separate production records that may be signed by the HSM to prove that a particular record has been used.

This advantageously provides the OEM 102 with the ability to further securely provide a third-party Factory 104 (that is contracted to manufacture its products) with individual per-device credentials, with the knowledge that the Factory 104 is unable to clone extra devices. Such advantages are possible because the Factory 104 is unable to re-use the OEM's per-device credentials without explicit OEM authorization.

In embodiments, the OEM 102 creates individual "records" for each programmable device, which it signs, which may include encrypted content. The record comprises a unique sequence element and the product identifier as well as optionally comprising any one or more of: the data file identifier; the configuration file identifier; metadata identifier; script identifier; and the HSM identity. In this regard, the information comprised in a record may only be used to program a programmable device once. Therefore, although there is no requirement that requires a record's information to be programmed onto a particular (i.e. unique) programmable device, there is a requirement that information in a record may only be programmed onto one programmable device (this is an effect of the methods involving the sequence element). In other words, one record cannot be used to program multiple programmable devices. For example, if there are two records, A and B, and two programmable devices i and ii, then record A may be used to program programmable devices i or ii. Record A cannot be used to program programmable devices i and ii. Similarly, record B may be used to program programmable devices i or ii. Further similarly, record B cannot be used to program programmable devices i and ii. In other words, a record can be used to program a single but not specific programmable device.

Figure 7:
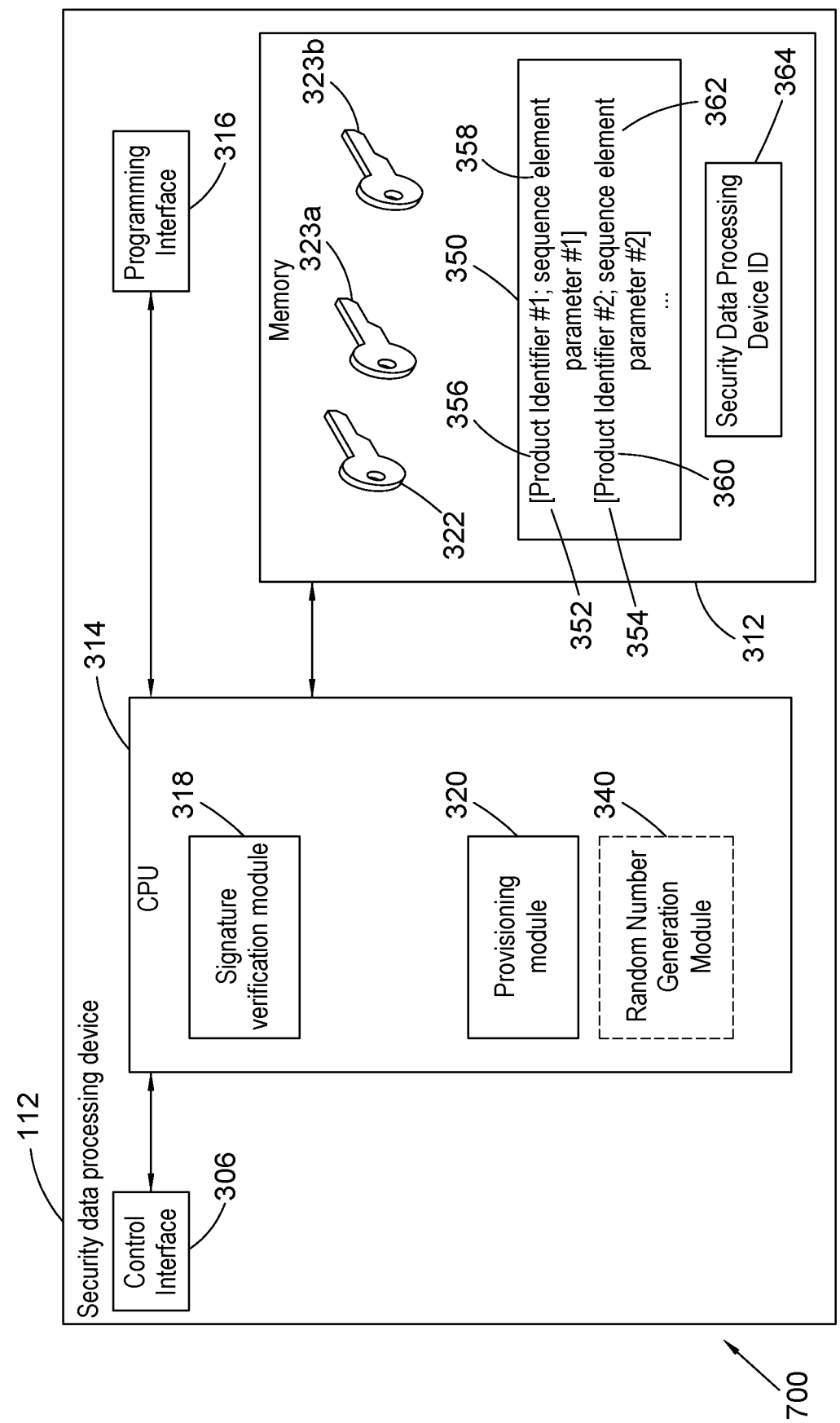
FIG. 7 shows a security data processing device.

FIG. 7 shows an embodiment of the security data processing device 112, wherein the processor 314 comprises a random number generation module 340 which is configured to generate one or more random numbers. Alternatively, the random number generation module 340 may be external to the processor 314 but nevertheless on the security data processing device 112 such that the random number generation module 340 is in communication with the processor 314. Alternatively, the random number generation module 340 may be situated on an external device and the processor 314 may receive a random number from such an external device via the interface 306 and/or 316.

In the embodiment shown in FIG. 7, comprises a sequence memory block 350. The sequence memory block 350 stores one or more sequence entries. FIG. 7 shows an example where the sequence memory block 350 stores two sequence entries, a first sequence entry 352 and second sequence entry 354. The first sequence entry 352 comprises a first product identifier 356 and a first sequence element parameter 358, where the first product identifier 356 is associated with and/or corresponds to the first sequence element parameter 358. Similarly, the second sequence entry 354 comprises a second product identifier 360 and a second sequence element parameter 362, where the second product identifier 360 is associated with and/or corresponds to the second sequence element parameter 362. The product identifiers (for example the first product identifier 356 and second product identifier 360) may, for example, correspond to a product identifier found in the data file, a received record, a programming request and an instruction set.

Whilst FIG. 7 illustrates that the sequence memory block 350 is capable of storing multiple sequence entries, in embodiments the sequence memory block 350 may store a single sequence value.

FIG. 7 shows the sequence element parameter 358 without an associated value. However, in embodiments, the sequence memory block 350 may store the sequence element parameter 358 alongside an associated value, or alternatively, may only store a value which the processor is configured to read as the value associated with the sequence element parameter. Similarly, the first product identifier 356 may be stored as a label or parameter with an associated value for the product identifier, alternatively, the memory may store merely a value. In embodiment, the first sequence entry 352 may be stored as an array of two numbers that the processor 314 is configured to read as a product identifier with an associated sequence element value.

Each of the product identifiers 356 and 360 may be associated with different data files. In this way, the security data processing device 112 is able to efficiently store information required to program many different types of products where the products are associated with a data file. The security data processing device 112 is able to efficiently store historical data relating to previous programming operations for a particular device by storing the product identifier 356 and the sequence element parameter 358, rather than storing an entire catalogue of previously provisioned programming information for a type of device (i.e. for devices provisioned in accordance with a particular configuration file).

The memory 312 may additionally store a security data processing device identifier 364. The security data processing device identifier 364 is a unique identifier that uniquely identifies the security data processing device 112 and can be used to distinguish the security data processing device 112 from other security data processing devices (e.g. that may be located in the same factory as the security data processing device 112). The use of such a security data processing device identifier 364 enables more efficient routing of information to security data processing devices, as well as providing more security.

In line with the previously discussed embodiment as shown in FIG. 3, the memory 312 stores cryptographic keys 322, 323*a* and 323*b* which have the same function as described with respect to FIG. 3.

Figure 8:
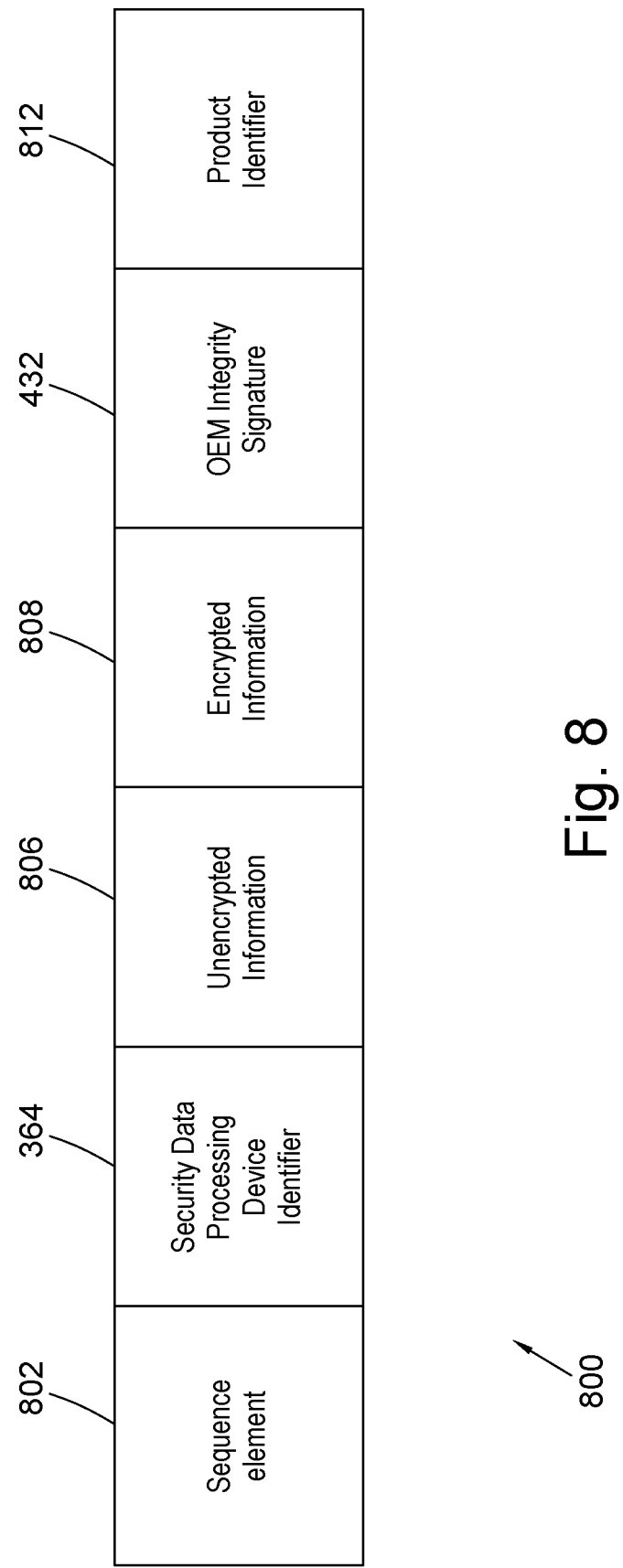
FIG. 8 shows a schematic block diagram of a record.

FIG. 8 shows an example record 800.

The record comprises a sequence element 802 which may comprise one or more of: one or more letters; one or more numbers; and one or more other characters. The sequence element is an element of a sequence. In some embodiments, the sequence element 802 is the output of a sequence element fed into a hashing function. In other embodiments, the sequence element 802 is in the clear e.g. in plain text or a number.

The record also comprises a product identifier 812. The product identifier 812 may be associated with a type of product, for example a type of electronic device. The record may comprise a product identifier 812 in embodiments where there is more than a single entry stored in the memory block 350.

In embodiments, the processor 314 is configured to receive a programming request that references an instruction set, which in turn references a data file. The instruction set may reference a metadata file, which in turn references a data file. The referenced data file comprises a product identifier 460, which may be referred to as a programming request product identifier 460 because, as explained, the product identifier 460 is directly or indirectly referred to by the programming request. The processor 314 is configured to retrieve a record having a product identifier that corresponds to the programming request product identifier 460. For example, the processor may be configured to query the memory with the programming request product identifier 460 to determine if a record with a product identifier that corresponds to the programming request product identifier 460 is stored in memory 312, and if so, then access that record. The processor 314 may be configured to request, from the programming machine, a record having a product identifier that corresponds to the programming request product identifier 460 if such a record is not stored in memory 312.

Regardless of how the processor 314 retrieves the record, the processor retrieves a record having a product identifier 812 that corresponds to the programming request product identifier 460. The processor 314 is configured to query the memory 312 to determine a value of the sequence element parameter that is associated with the product identifier 812. A value and an associated product identifier may be referred to collectively as a sequence entry. The sequence element 802 is associated with the product identifier 812, and the product identifier 812 is processed by the processor 314 to determine which sequence the sequence element 802 refers to (and/or is part of). Similarly, to the sequence element 802, the product identifier 812 may comprise one or more of: one or more letters; one or more numbers; and one or more of any other character or symbol.

Optionally, the record may comprise a security data processing device identifier 364. The security data processing device identifier 364 corresponds to the security data processing device identifier 112 in FIG. 3 and can be used by, for example, a routing machine located in a factory to route the record efficiently and quickly to the intended security data processing device 102. This may be particularly advantageous in a factory comprising many security data processing devices, where many records are being processed each day. However, in a factory that comprises a single or a few security data processing devices, the security data processing device identifier 364 may not be as advantageous (compared to a factory with many security data processing devices) because the routing may be done manually. In the case where there is only a single security data processing device, the routing merely requires the sending of the record to the single security data processing device in the factory and therefore the security data processing device identifier 364 may be omitted.

The record comprises encrypted information 808. In general, the encrypted information 808 is information that OEM and/or the creator of the record deems sensitive information that they would not want an interceptor to intercept and determine. Examples of such encrypted information are cryptographic keys, cryptographic certificates, source code for a device or other sensitive information. As previously described with respect to the 'wrappedVal' associated with the parameter 'keyId2' 514 in FIG. 5, the encrypted information 808 may be wrapped (i.e. encrypted) using a HSM wrapping key 550 and can be decrypted by the security data processing device 112 by using the OEM unwrapping key 322. Alternatively, the encrypted information 808 may be encrypted/decrypted using a further symmetric key or asymmetric key pair stored in the memory 312. The encrypted information comprises per-device information which is to be programmed onto only one programmable device.

The record may additionally comprise unencrypted information 806. The unencrypted information 806 may be information that is eventually programmed onto a programmable device 206 and/or may be instructions to the security data processing device 102 on how to provision the programmable device 206. The unencrypted information 806 may refer to other operations such as instructions for cryptographic operations to be performed by the processor 314. For example, and with reference to FIG. 5, the unencrypted information 806 may comprise 'val1', 'certificateval' and 'generated' values that correspond to the parameters 'Value1', 'Cert1' and 'keyId1' respectively. As shown in FIG. 8 the record may also comprise the OEM Integrity Signature 432 (shown in FIG. 5). The record may comprise a signature (not shown) different to OEM Integrity Signature 432 that may be signed by the OEM 102. Regardless of the exact signature, the record may comprise a signature that is verifiable by the security data processing device 112.

Figure 9:
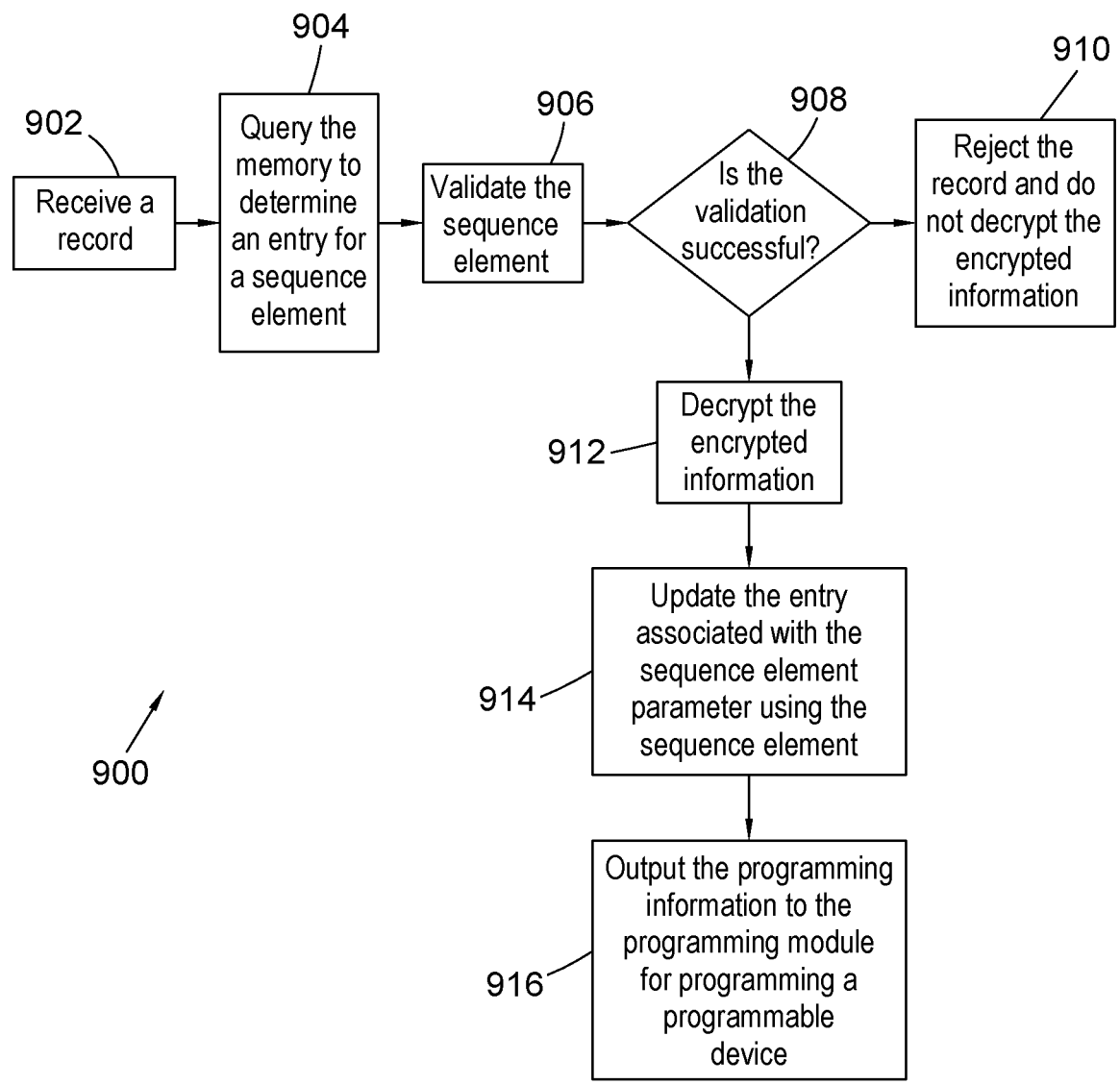
FIG. 9 is a flow chart of a process performed by the security data processing device for programming a programmable device in accordance with embodiments described herein.

FIG. 9 shows the operations performed when a record is received by the processor 314. As will be explained in more detail below, in a first embodiment a record is received prior to the processor 314 receiving a programming request requesting the use of a record. In a second embodiment, the processor 314 receives a programming request requesting the use of a record in response to which the processor 314 transmits a request for a record (e.g. to the programming machine 202.

FIG. 9 shows a flow diagram of an example process 900 carried out by the processor 314 of the security data processing device 102 that can be performed in addition to the process illustrated in FIG. 6, the process 900 is performed by the processor 314 in response to receiving a record.

In addition to the security benefits provided by the process displayed in FIG. 6 (for example, security benefit provided by the verification of certificate chains), the process of FIG. 9 when incorporated into the process displayed in FIG. 6 provides further security advantages. An example of such a security advantage is that it is more difficult for a factory to produce clone devices because each programmable device is programmed with per device information.

The process 900 begins at step 902 where the processor 314 receives a record.

In response to the processor receiving the record at step 902, the processor 314 is configured to perform a number of operations.

At step 904, the processor 314 queries the sequence memory block 350 of the memory 312 to determine the value for a sequence element parameter stored in the sequence memory block 350.

In some embodiments, the sequence memory block 350 may comprise multiple sequence entries such as sequence entry 352 and sequence entry 354, in these embodiments the product identifier 812 is used to determine the correct value for validating the record. In these embodiments, the processor 314 reads the product identifier 812 from the received record and queries the sequence memory block 350 of the memory 204 with the product identifier 812 to determine the value for a sequence element parameter stored in the sequence memory block 350 in association with the product identifier 812.

In embodiments, the product identifier 812 corresponds to a product identifier in the data file previously received by the processor 314. In embodiments, the processor 314 is configured to query the memory to determine the corresponding value for validating the record. In this embodiment, the processor 314 may have received a data file comprising a product identifier prior to, or approximately simultaneously to, receiving the record and therefore has stored the product identifier (of the received data file) and the corresponding value for the product identifier.

At step 906, the processor 314 validates the sequence element 802 of the received record using the sequence element 802 of the received record and the sequence element parameter stored in the sequence memory block 350 that is associated with the product identifier 812. The processor 314 may perform the validation of the sequence element at step 906 in a number of different ways depending on the sequence that the sequence element 802 of the received record is part of. However, generally speaking, the processor validates the sequence element by determining if the sequence element 802 (i.e. the sequence element in the received record) is later in the sequence than the value corresponding to the sequence element parameter e.g. 358. The processor therefore may be configured to determine the element in the sequence following the value for the sequence element parameter 358 and determine if the sequence element 802 matches the following element. However, in some embodiments the received sequence element 802 may not be the element in the sequence directly following the value corresponding to the sequence element parameter 358 but rather may be multiple steps in the sequence beyond that of the value for the sequence element parameter 358. In either example, the processor may determine multiple elements in the sequence either side of the value corresponding to the sequence element parameter.

As an example, the sequence may be a sequence of numbers in ascending order incrementing by 1 and the sequence element parameter 358 may have a value of 5, the product identifier 356 may have a value of 'product A'. If the product identifier 812 in the received record has a value of 'product A' then the processor, after querying the memory with the product identifier 812, will determine that the sequence entry 352 is the relevant sequence entry for the received record because the product identifier 812 in the record corresponds to the product identifier 356 (rather than say, for example, the product identifier 360 which in this example has a value of 'product B'). Once the processor has determined that the value 352 is the relevant value for the received record, the processor is configured to determine that the value corresponding to the sequence element parameter 358 is equal to 5. If, for example, the sequence element 802 in the received record has a value of 6, then the processor determines that the received sequence element 802 has a value that corresponds to an element that is further in the sequence than the value for the sequence element parameter, in other words the processor determines that 6 is a later element in the series of ascending numbers than 5. In this example, the processor may be able to determine that the received sequence element 802 is later in the sequence than the value of the sequence element parameter 358 by performing the calculation such as merely determining that the sequence element 802 is greater than the value of the sequence element parameter 358 because the sequence is merely a simple incrementation of 1.

In other examples, the sequence may be a different function rather than incrementing and maybe for example be a decrementing sequence. The sequence may be a linear sequence, or a non-linear sequence. A sequence may be linear and increasing (or linear and decreasing), for example, a linear sequence may be a sequence that increases by 2 each step (i.e. 2, 4, 6, 8). A non-linear sequence may be a sequence that follows a non-linear function (with increasing and/or decreasing entries), for example, a quadratic function. For example, a non-linear sequence may be a sequence of increasing square numbers: 1, 4, 9, 16 . . . . A further example may be an exponential function (with increasing or decreasing entries). In the case of a non-linear sequence, the processor may be configured to determine one or more sequence elements following and/or preceding the value for the sequence element parameter 358, and then further determine whether the sequence element 802 is later or earlier in the sequence than the value for the sequence element parameter 358.

Regardless of the exact sequence that is used, at step 908 the processor 314 determines if the validation performed in step 906 is successful.

The validation in steps 904-908 is generally performed in response to receiving a record. Thus, the validation in steps 904-908 may be performed before, after, or in-between the verifications of the record and the configuration file (and/or script file) in steps 604 and 610 respectively. For example, the processor may be configured to validate the sequence elements before or after verifying, for example, the certificate chain of the data file.

At step 910, if the validation is not successful then the processor 102 is configured to reject the record and not decrypt any information contained in the record. The processor may be configured in this scenario to perform further steps such as store information in the memory 204 indicating that an unsuccessful request for programming information has been received. In other examples, in response to determining that the validation is not successful, the processor may be configured to transmit a message to, for example, the OEM 102 or the programming machine, thereby informing such a party or device that the validation has not been successful. Advantageously, if the processor is configured to send a message to the OEM 102 in response to determining unsuccessful validation, then the OEM 102 may be aware that the factory is attempting to maliciously create a clone device. This may be advantageous because it enables the OEM 102 to take action against such a factory at an earlier stage than other methods of programming devices. If the processor is configured to output the indication to the factory that the validation has been unsuccessful, then in the case of a non-malicious attempt to program a programmable device, this may be advantageous for the factory because the validation data may have been unsuccessful due to a programming error, or routing error rather than a malicious attempt to create clone devices. This is advantageous for the parties associated with the factory because it allows them to be aware of any programming or routing errors in the early stage of the programming proceedings.

If the validation is successful then the process 900 proceeds to step 912 where the processor is configured to decrypt the encrypted information found in the record. In embodiments, the decryption (i.e. step 912) may be further dependent on the verification of steps 606 and/or 610. Therefore, in embodiments, step 912 may not take place if, for example, the signature of the configuration file 213 and data file 216 is not verified.

The processor may be configured to output the decrypted information directly to the programming machine for programming onto a programmable device 206. Additionally, or alternatively, the decrypted information may be processed by the processor prior to outputting to the programming machine. For example, the processor may be configured to use the decrypted information used in cryptographic operations such as the creation of keys and/or certificates and further configured to transmit the subsequently processed decrypted information to the program machine for programming onto a programmable device 206. Additionally or alternatively, the decrypted information, rather than being for example cryptographic keys to be used in a cryptographic operation, may rather be instructions for execution by the processor. Such instructions may be to create a key or to sign a certificate. Other forms of encrypted information may be source code or other sensitive information that the OEM would not want interceptor to be able to read in the clear.

The processor may be configured to, upon the loading of a subsequent record on the HSM (and further optionally following the decryption of the subsequent record), destroy any previous information relating to the previously stored record. For example, the processor may be configured to remove information (e.g. keys and credentials) relating to the previous record and replace such information (e.g. keys and credentials) with the new information (e.g. keys and credentials) from the new record. The next programmable device may then be provisioned using the new information (e.g. keys and credentials). Advantageously, this saves memory space in the HSM 104. Further advantageously, this prevents accidental availability of previous records and thus limits the information available to an interceptor.

At step 914, the processor is configured to update the value associated with the sequence element parameter 358 to the sequence element 802. The processor may further be configured to remove any other information stored in the memory referring to the previous value associated with the sequence element parameter i.e. any information associated with the value. This advantageously frees up space in the memory of the security data processing device 102, and further prevents availability of previous records, thus decreasing the damage of a malicious attack.

At step 916, the processor is configured to transmit programming information to the programming machine, e.g. the programming module on the programming machine, for programming onto a programmable device. This programming information is based on at least the encrypted information 808 in the record that has been decrypted. The programming information may comprise the decrypted information or alternatively the processor 314 may process the decrypted information prior to outputting it to the programming machine. The programming information may be additionally based on the unencrypted information 806 in the record.

Regarding the timing of step 916, the programming information may or may not be output in response to receiving the record and the subsequent validation of the record. This is described in more detail below.

Step 914 and step 916 may be performed in an interchangeable order and/or maybe performed simultaneously.

Step 916 may correspond to, for example, step 618 of FIG. 6.

The end result of process 900 leaves the security data processing device 112 in a broadly equivalent state to the state that the security data processing device 112 was prior to the start of process 900, but with an updated value for the sequence element parameter. In this sense, the process 900 is a cyclical process, whereby the security data processing device 112 has a memory 312 comprising one or more sequence entries at the beginning and end of the process. For example, the processor 314 receives a record and determines if the record is valid, and if it is valid, performs a number of operations (such as decrypting) on the record before outputting programming information to a programmed machine. The processor then updates the value that was used to validate the received record.

As described above, the process of FIG. 9 is performed by the processor in response to receiving a record.

n a first embodiment, the processor is configured to receive a record and to perform the steps 902 to 914 (step 912 is optional at this stage), following which the record is stored in memory 312 for later use. In this embodiment step 916 is not performed immediately after step 914. In this embodiment, the processor is configured to receive the record without requesting a record. In other words, the record is 'pushed' to the processor rather than 'pulled' by the processor. An instruction set identified in the received programming request instructs the processor to use a record to program a programmable device. The instruction set may not specify the exact record to use but rather specifies that a record needs to be used to program a programmable device. The processor 314 is configured to determine which record is to be used to program a programmable device by using a programming request product identifier. There are multiple ways in which the processor can identify the programming request product identifier which is used to identify which record to use to program a programmable device, these are explained below. In this embodiment, the processor 314 determines that the relevant record (as determined using the programming request product identifier) is stored in memory 312, therefore the processor does not need to request the record from elsewhere. That is, the processor 314 retrieves the stored record from memory 314 based on identifying that the programming request product identifier matches the product identifier of the stored record. The processor 314 is then configured to perform step 916 and output programming information to the programming machine 202 based on the information decrypted from the record (at step 912).

In an alternative embodiment, an instruction set identified in the received programming request instructs the processor to use a record to program a programmable device, however a suitable record is not stored in the memory 312. The processor 314 is configured to identify a programming request product identifier. In this embodiment, upon determining that the memory 314 does not comprise a record with a product identifier matching the programming request product identifier, the processor 314 is configured to request a record. In this sense the request is 'pulled' by the processor 314 in response to determining that a suitable record is not stored in the memory, rather than the record being 'pushed' to the processor. The record may be requested and received from the programming machine or elsewhere, for example, an external storage device. Following receipt of the record, the processor 314 performs the process 900 shown in FIG. 9. It will be appreciated that in this embodiment step 916 is performed once step 914 has been performed.

As noted above, there are multiple ways in which the processor can identify the programming request product identifier which is used to identify which record to use to program a programmable device.

A first example is when the programming request comprises the programming request product identifier and the processor is configured to read the programming request to identify the programming request product identifier.

A second example is when the data file comprises the programming request product identifier and the processor is configured to access the data file to identify the programming request product identifier.

A third example is where the instruction set identified by the programming request comprises the programming request product identifier and the processor is configured to read the instruction set to identify the programming request product identifier.

Advantageously, an OEM 102 that wants to use an external Certificate Authority (CA) to provide its device certificates (or other confidential information) can securely provide per-device records to a factory and be sure that the factory is unable to use the confidential information to create cloned devices. This increases the efficiency of securing the manufacturing processing flow for the Internet of Things devices. Further advantageously, embodiments of the present invention enable end customers to rely on the security and authenticity of programmable devices they purchase, and further advantageously gives confidence to the customer that the programmable device is not from the 'grey' market of lower quality and cloned devices with inferior support.

An advantage of embodiments of the invention is that the OEM 102 can release per-device credentials to a Factory in the knowledge that they can each only be used once to create a single device. Additionally, if the OEM 102 is using an external CA, and has paid for each credential, then the OEM 102 can demonstrate to the CA that the OEM 102 can only use each credential once.

If the sequence elements are used out of sequence, there will be gaps in the sequence. The factory databases will enable the OEM 102 to know about gaps, and the paid-for items can be re-processed with later sequence elements so that they can be used (but only by the OEM 102, as a signature is needed). The previous records from within the gap cannot be used by the Factory at all because the value corresponding to the sequence parameter stored in the HSM has progressed past the sequence element contained in the previous record.

The OEM 102 may create and sign an instruction to permit re-injection of one or more old records, or reset the value corresponding to the sequence parameter to a particular value: the OEM 102 takes responsibility to override the cloning protection here via its signature. This is advantageous because each record may comprise a certificate (or other cryptographic item, such as a key) that has been produced by a third party, for example, a Certificate Authority. The OEM 102 may have paid for each of the certificates produced by the CA. In some circumstances, (whether due to an error or done purposefully) the value corresponding to the sequence parameter may skip multiple steps in the sequence between programming one programmable device to another. For example, with a simple incrementing sequence, a first record may have a sequence element that equals 1, there may be several thousand other records in a batch of records, with each subsequent record having a sequence element incrementing by 1 (i.e. there may be 2000 records, with the sequence elements starting at 1 and ending at 2000). The first record (with a sequence element of 1) may be received by the HSM, the following record received by the HSM may (due to an error or otherwise) have a sequence element of 1000. The HSM would duly process this record (because 1000 is greater than 1) and then update the sequence parameter to equal 1000. In embodiments of the present invention, the HSM does not allow the value corresponding to the sequence parameter to be changed to a value earlier in the sequence. This would mean that the OEM loses the cost of the certificates and keys contained in the intermediary records (for example in the records comprising the sequence entries 2-999). However, by having in place a system where the sequence parameter can be reset (and/or merely changed) in response to receiving verifiable instructions from the OEM, then the OEM is able program devices using the interim records (e.g. records having sequence elements 2-999). Therefore, advantageously the OEM does not lose the costs associated with the certificates and keys that have been paid for and are contained in the interim records.

In exceptional circumstances, the HSM may undergo a full reset in which all its memories are re-initialized, thus losing the identities and sequence parameters stored in memory. To prevent cloning under these circumstances (i.e. by reintroducing previously-used records), the HSM may have some special functionality on full reset: it can use the random number generator 340 to produce and store a new random number, and this random number is used to modify the decryption key and thereby obtain a new key. The new key may therefore be marked as different. Although the value corresponding to the sequence parameter may have been zeroed following the reset (i.e. the sequence parameter is set to the zeroth element in the sequence), it is still not possible to load previously-used records. This is because the encrypted information in the previously used records were encrypted with the previous, different key. Therefore, the new, modified key is unable to decrypt the encrypted information found in the previously used records. Following the reset, the OEM has to be asked to re-encrypt the encrypted information in the records for the new HSM encryption key. This advantageously, prevents the Factory from creating clones (without the OEM's connivance) by merely performing a full Reset.

The sequence element may be obscured by using a hashing function based on an underlying sequence number that follows a simpler sequence. This may benefit an OEM by obscuring product volumes information. For example, rather than the HSM receiving a batch of records comprising records with sequence elements of 11, 12 and 13 respectively, the HSM may receive records comprising records with sequence elements of the hash of 11, 12 and 13, which may be referred to as X, Y and Z. To an interceptor intercepting the records, the interceptor would merely see X, Y, and Z. Advantageously, because X, Y and Z are the hashed values of 11, 12, and 13, the interceptor would find no information that could be used to determine the underlying sequence (i.e. increase by one) because X, Y, and Z would be seemingly random unrelated numbers/letters because they are the output of a hash function. Additionally, the interceptor would not be able to determine the volume of the records, in other words, if the interceptor saw the unhashed sequence elements 11, 12, and 13, the interceptor may be able to estimate that approximately 10 devices have been programmed thus far (because the sequence element is now on 11). Similarly, if the interceptor intercepted sequence elements of 1001, 1002, and 1003, the interceptor may determine that 1000 programmable devices have been programmed. By hashing the sequence elements, the interceptor is unable to obtain such information.

The OEM may individually sign a record with its own secret asymmetric key. The public key is securely given to the HSM. This results in a record being self-contained for cryptographic purposes and thus saving the HSM from having to load large amounts of data to check signatures. For example, if the OEM signed a file comprising a batch of 100,000 records then the HSM would have to load all 100,000 records in order to verify the signature of the batch of records. However, if the OEM signs each record individually then the HSM can load a single record, verify the single record, process the record, remove the record and then load the next record. Advantageously this means that by verifying a single record, the HSM can operate more efficiently because less processing power and memory is required compared to if the HSM had to load 100,000 records. In other words, the OEM may include in the record a unique sequence number (for instance starting from 1 or some other value and incrementing), and a corresponding product identifier that are signed in a way that only someone with the OEM signing key can do this.

While the present disclosure has been particularly shown and described with reference to preferred embodiments, it will be understood to those skilled in the art that various changes in form and detail may be made without departing from the scope of the present disclosure as defined by the appendant claims.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A security data processing device, the security data processing device comprising:
   a computer processor; and
   a memory coupled to the processor, the processor executing computer readable instructions causing the processor to:
   receive a script comprising at least one instruction set for provisioning a type of remote programmable device, each of the at least one instruction set defining one or more cryptographic operations to be performed by the security data processing device, each of the one or more cryptographic operations referring to a parameter;
   store the script in the memory;
   retrieve a first authorization key from said memory and verify a signature associated with the script using the first authorization key, wherein the script is signed by a producer of the script;
   receive a programming request from a programming module of a programming machine in communication with said processor, said programming request requesting the programming of a remote programmable device and identifying an instruction set of the least one instruction set in said script;
   for each of the one or more cryptographic operations in the identified instruction set, determine a value for the parameter referred to in the cryptographic operation and perform the cryptographic operation using the value;
   in response to performing each of the one or more cryptographic operation, output programming information to the programming module for programming the remote programmable device; and
   at a later time, output additional programming information to the programming module for programming a further remote programmable device.

2. The security data processing device of claim 1, wherein for one or more of the cryptographic operations in the identified instruction set, the processor configured to executes computer readable instructions to determine the value for the parameter defined in the cryptographic operation by extracting said value from the programming request.

3. The security data processing device of claim 1, wherein for one or more of the cryptographic operations in the identified instruction set, the processor to executes computer readable instructions to determine the value for the parameter defined in the cryptographic operation by reading said value from the script.

4. The security data processing device of claim 1, wherein the processor to executes computer readable instructions to receive the script and metadata in a configuration file and for one or more of the cryptographic operations in the identified instruction set, the processor to executes computer readable instructions to determine the value for the parameter defined in the cryptographic operation by querying said metadata.

5. The security data processing device of claim 4, wherein the metadata is signed and the processor executes computer readable instructions to verify a signature of the metadata using the first authorization key or a second authorization key.

6. The security data processing device of claim 5, wherein the metadata is signed by the producer of the script.

7. The security data processing device of claim 4, wherein the script comprises a unique identifier and the metadata includes a reference to the unique identifier of the script.

8. The security data processing device of claim 4, wherein the metadata defines the value for the parameter.

9. The security data processing device of claim 4, wherein the metadata defines that the value is to be generated by the security data processing device, the processor to executes computer readable instructions to determine the value for the parameter by generating said value.

10. The security data processing device of claim 4, wherein the metadata defines that the value is to be accessed from a data file, the processor executes computer readable instructions to:
   access the data file comprising at least a value for said parameter;
   retrieve a third authorization key from said memory and verify a signature associated with the data file using the third authorization key, wherein the data file is signed by a manufacturing party;
   wherein the processor to executes computer readable instructions to determine the value for the parameter based on querying the data file.

11. The security data processing device of claim 10, wherein the processor to executes computer readable instructions to receive the data file and store the data file in the memory.

12. The security data processing device of claim 11, wherein the metadata comprises a unique identifier and the data file includes a reference to the unique identifier of the metadata.

13. The security data processing device of claim 11, wherein the value for said parameter is encrypted and the processor to executes computer readable instructions to decrypt the value with a wrapping key stored in said memory.

14. The security data processing device of claim 4, wherein the metadata is encrypted and the processor executes computer readable instructions to decrypt the script with a cryptographic key stored in said memory.

15. The security data processing device of claim 1, wherein the programming module performs programming of the programmable device in accordance with a programmer script, the programmer script comprising a unique identifier, and the script comprises a reference to the unique identifier of the programmer script.

16. The security data processing device of claim 1, wherein the script is encrypted and the processor executes computer readable instructions to decrypt the script with a cryptographic key stored in said memory.

17. The security data processing device of claim 1, wherein the processor executes computer readable instructions to:
receive a record comprising: a product identifier; a sequence element; and encrypted information, wherein the sequence element is associated with the product identifier;
query the memory using said product identifier to determine a value for a sequence element parameter that is stored in the memory in association with the product identifier, wherein the sequence element and the value for the sequence element parameter are elements of a sequence;
validate the sequence element using the sequence element and the value for the sequence element parameter, and in response to said validation:
store said record in memory; and
update the value for the sequence element parameter using the sequence element;
wherein the instruction set identified by said programming request instructs the processor to use a record to program said remote programmable device, the processor executes computer readable instructions to:
identify a programming request product identifier;
retrieve the stored record from memory based on identifying that the programming request product identifier matches the product identifier of the stored record;
decrypt the encrypted information of said stored record using a cryptographic key stored in the memory to obtain decrypted information;
output further programming information to the programming module for programming the remote programmable device, wherein the further programming information is based on said decrypted information.

18. The security data processing device of claim 1, wherein the instruction set identified by said programming request instructs the processor to use a record to program said remote programmable device, the processor executes computer readable instructions to:
identify a programming request product identifier;
transmit a request for a record comprising a product identifier matching the programming request product identifier;
receive a record, the record comprising said product identifier; a sequence element; and encrypted information, wherein the sequence element is associated with the product identifier;
query the memory using said product identifier to determine a value for a sequence element parameter that is stored in the memory in association with the product identifier, wherein the sequence element and the value for the sequence element parameter are elements of a sequence;
validate the sequence element using the sequence element and the value for the sequence element parameter, and in response to said validation:
update the value for the sequence element parameter using the sequence element;
decrypt the encrypted information of said record using a cryptographic key stored in the memory to obtain decrypted information; and
output further programming information to the programming module for programming the remote programmable device, wherein the further programming information is based on said decrypted information.

19. A computer implemented method, the method implemented on a security data processing device, and comprising:
receiving a script comprising at least one instruction set for provisioning a type of remote programmable device, each of the at least one instruction set defining one or more cryptographic operations to be performed by the security data processing device, each of the one or more cryptographic operations referring to a parameter;
storing the script in a memory of the security data processing device;
retrieving a first authorization key from said memory and verify a signature associated with the script using the first authorization key, wherein the script is signed by a producer of the script;
receiving a programming request from a programming module of a programming machine in communication with said processor, said programming request requesting the programming of a remote programmable device and identifying an instruction set of the least one instruction set in said script;
for each of the one or more cryptographic operations in the identified instruction set, determining a value for the parameter referred to in the cryptographic operation and performing the cryptographic operation using the value;
in response to performing each of the one or more cryptographic operation, outputting programming information to the programming module for programming the remote programmable device;
at a later time, output additional programming information to the programming module for programming a further remote programmable device.

20. A non-transitory computer-readable storage medium comprising instructions which, when executed by a processor of a security data processing device cause the security data processing device to:
receive a script comprising at least one instruction set for provisioning a type of remote programmable device, each of the at least one instruction set defining one or more cryptographic operations to be performed by the security data processing device, each of the one or more cryptographic operations referring to a parameter;

store the script in a memory of the security data processing device;

retrieve a first authorization key from said memory and verify a signature associated with the script using the first authorization key, wherein the script is signed by a producer of the script;

receive a programming request from a programming module of a programming machine in communication with said processor, said programming request requesting the programming of a remote programmable device and identifying an instruction set of the least one instruction set in said script;

for each of the one or more cryptographic operations in the identified instruction set, determine a value for the parameter referred to in the cryptographic operation and perform the cryptographic operation using the value;

in response to performing each of the one or more cryptographic operation, output programming information to the programming module for programming the remote programmable device;

at a later time, output additional programming information to the programming module for programming a further remote programmable device.

* * * * *

UNITED STATES PATENT AND TRADEMARK OFFICE
CERTIFICATE OF CORRECTION

PATENT NO. : 11,361,087 B2
APPLICATION NO. : 16/784373
DATED : June 14, 2022
INVENTOR(S) : Andrew Bott and Timothy Hoole It is certified that error appears in the above-identified patent and that said Letters Patent is hereby corrected as shown below:

On the Title Page

Please add the Foreign Application Priority Data Item (30) as follows:
-- Feb. 22, 2019 (GB) ...................... 1902470.2
Jun. 21, 2019 (GB) ...................... 19089390.0 --.

In the Claims

In Claim 2, Column 30, Line 21, delete "processor configured to" and insert -- processor --.

In Claim 3, Column 30, Line 27, delete "processor to executes" and insert -- processor executes --.

In Claim 4, Column 30, Line 32, delete "processor to executes" and insert -- processor executes --.

In Claim 4, Column 30, Line 35, delete "processor to executes" and insert -- processor executes --.

In Claim 9, Column 30, Line 52, delete "processor to executes" and insert -- processor executes --.

In Claim 10, Column 30, Line 65, delete "processor to executes" and insert -- processor executes --.

In Claim 13, Column 31, Line 11, delete "processor to executes" and insert -- processor executes --.

In Claim 19, Column 32, Line 57, delete "device;" and insert -- device; and --.

In Claim 20, Column 33, Line 24, delete "device;" and insert -- device; and --.

Signed and Sealed this
Sixteenth Day of August, 2022

Katherine Kelly Vidal
*Director of the United States Patent and Trademark Office*